United States Patent
Xiao et al.

(10) Patent No.: US 12,092,797 B2
(45) Date of Patent: Sep. 17, 2024

(54) OPTICAL IMAGING SYSTEM

(71) Applicant: Zhejiang Sunny Optics Co., Ltd, Yuyao (CN)

(72) Inventors: Liang Xiao, Yuyao (CN); Yu Tang, Yuyao (CN); Fujian Dai, Yuyao (CN); Liefeng Zhao, Yuyao (CN)

(73) Assignee: Zhejiang Sunny Optics Co., Ltd, Yuyao (CN)

( * ) Notice: Subject to any disclaimer, the term of this patent is extended or adjusted under 35 U.S.C. 154(b) by 480 days.

(21) Appl. No.: 17/542,312

(22) Filed: Dec. 3, 2021

(65) Prior Publication Data
US 2022/0179180 A1 Jun. 9, 2022

(30) Foreign Application Priority Data
Dec. 7, 2020 (CN) .......................... 202011416803.7

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .............................. G02B 9/64; G02B 13/0045
See application file for complete search history.

(56) References Cited

U.S. PATENT DOCUMENTS

| | | | |
|---|---|---|---|
| 2021/0116685 A1* | 4/2021 | Chen | G02B 13/0045 |
| 2021/0223515 A1* | 7/2021 | Tseng | G02B 27/0025 |
| 2022/0019059 A1* | 1/2022 | Kamebuchi | G02B 13/0045 |
| 2022/0035135 A1* | 2/2022 | Wang | G02B 9/64 |
| 2022/0066152 A1* | 3/2022 | Zhu | G02B 9/64 |

* cited by examiner

*Primary Examiner* — Ephrem Z Mebrahtu
(74) *Attorney, Agent, or Firm* — Reising Ethington P.C.

(57) ABSTRACT

An optical imaging system, along an optical axis from an object side to an image side, sequentially includes: a stop; a first lens having a refractive power; a second lens having a positive refractive power; a third lens having a positive refractive power, an object-side surface and an image-side surface of the third lens being convex surfaces; a fourth lens having a refractive power, and an image-side surface of the fourth lens being a convex surface; a fifth lens having a refractive power, and an image-side surface of the fifth lens being a concave surface; a sixth lens having a refractive power; and a seventh lens having a refractive power. A half of a maximum field-of-view Semi-FOV of the optical imaging system satisfies: Semi-FOV≤6°; and a total effective focal length f of the optical imaging system satisfies: f≥25 mm.

20 Claims, 11 Drawing Sheets

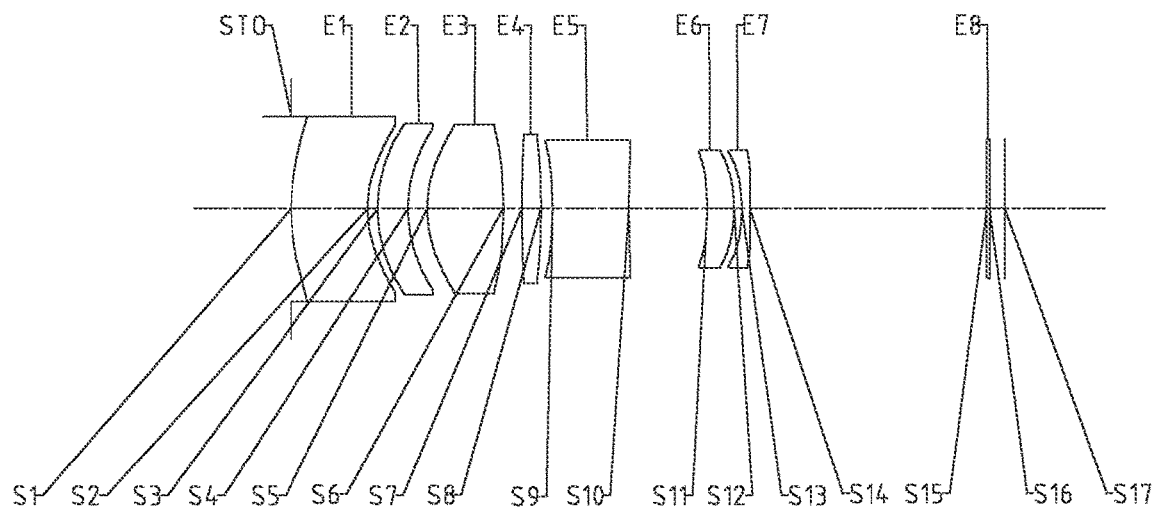
Fig. 1
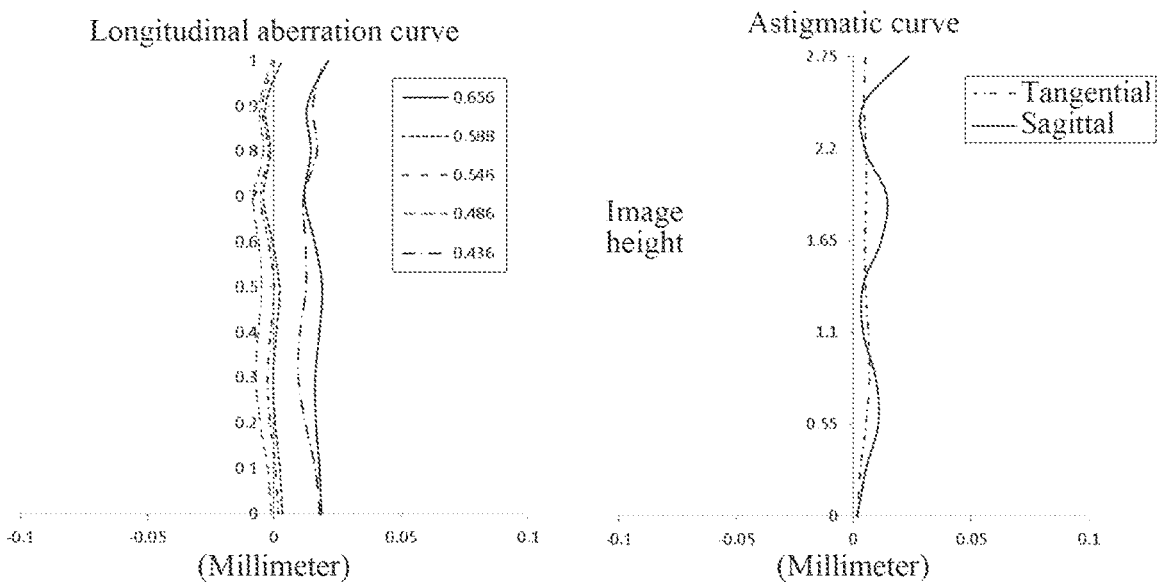
Fig. 2A
Fig. 2B

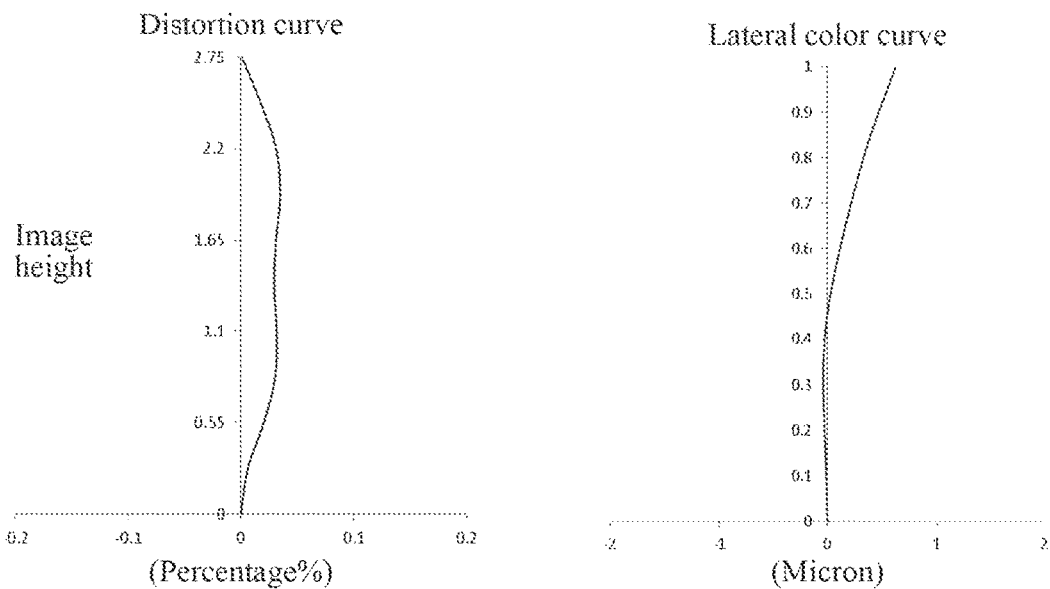
Fig. 2C
Fig. 2D
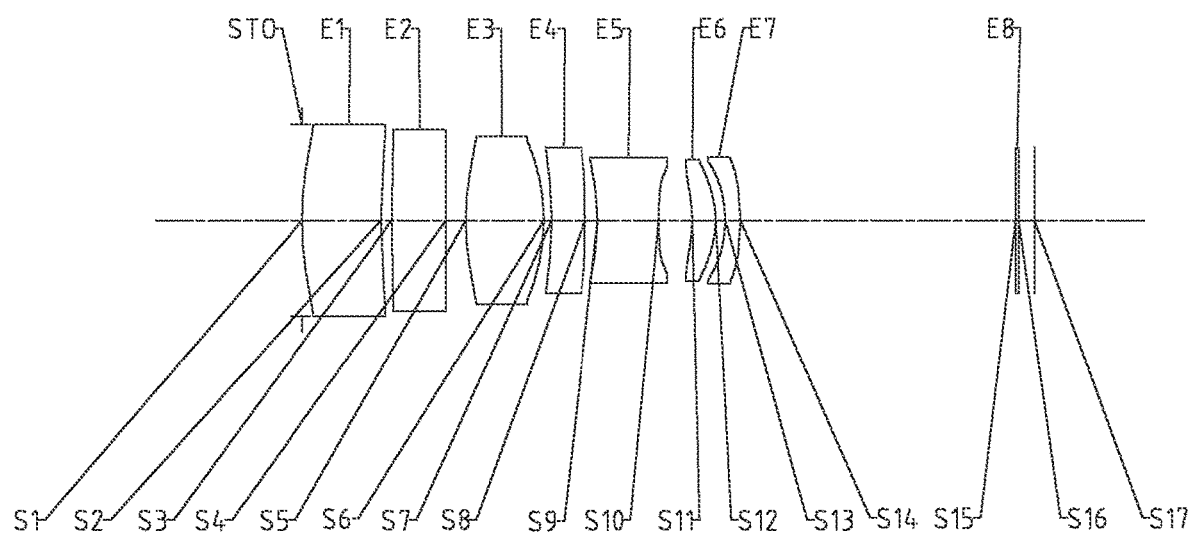
Fig. 3

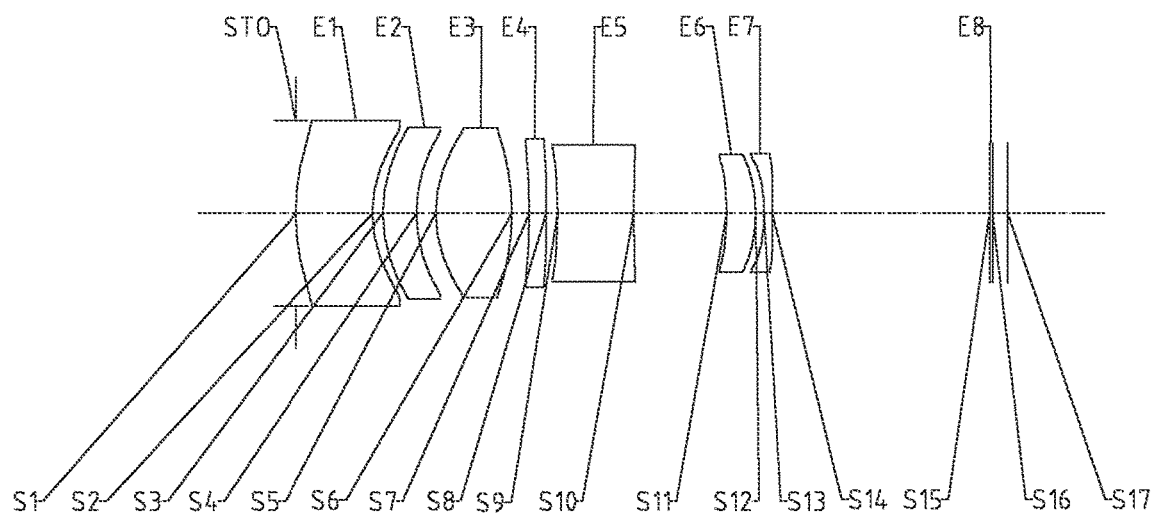
Fig. 5
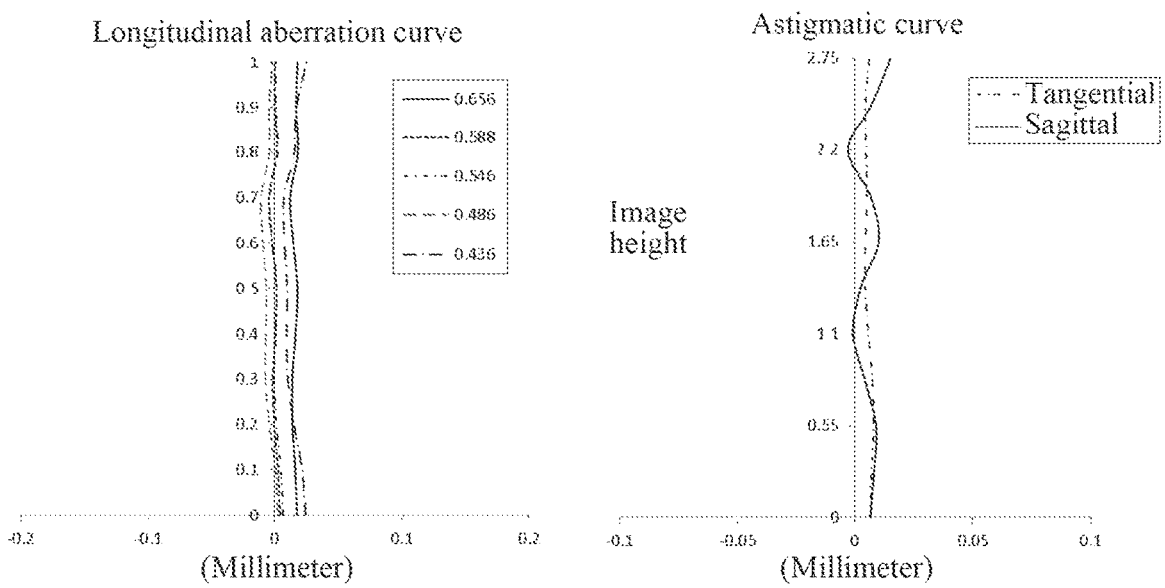
Fig. 6A                    Fig. 6B

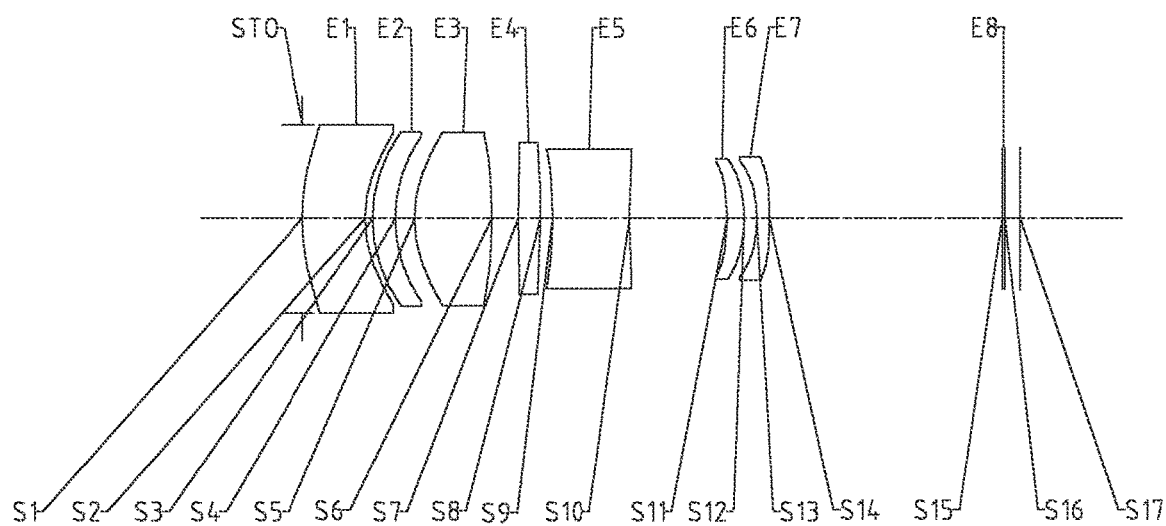
Fig. 13
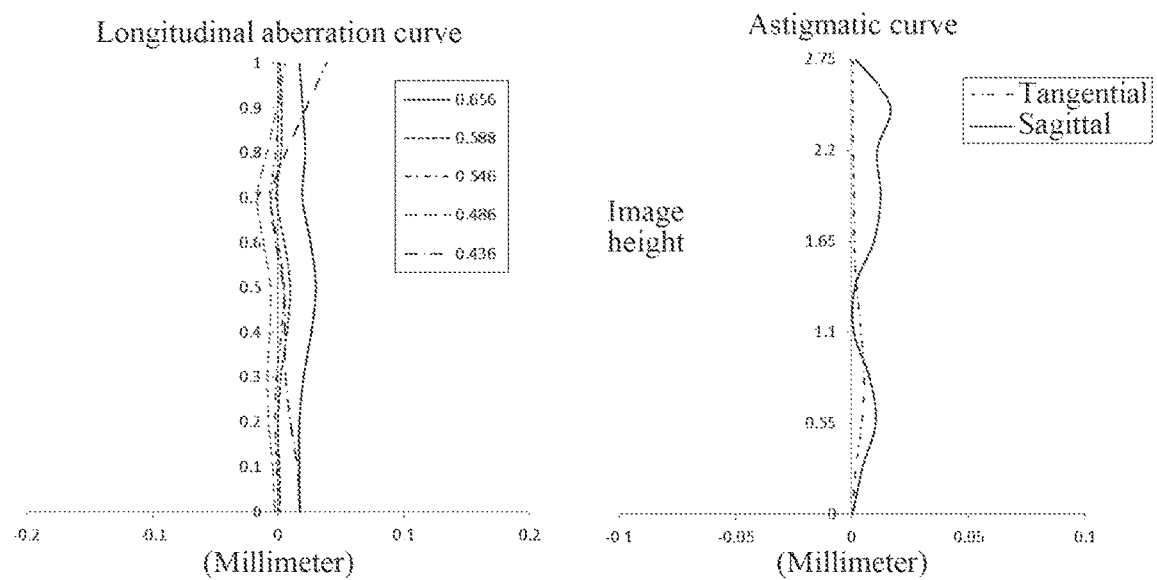
Fig. 14A
Fig. 14B

OPTICAL IMAGING SYSTEM

CROSS-REFERENCE TO RELATED APPLICATIONS

This application claims benefit of priority to Chinese Patent Application No. 202011416803.7 filed on Dec. 7, 2020 before the China National Intellectual Property Administration, the entire disclosure of which is incorporated herein by reference in its entity.

TECHNICAL FIELD

The present disclosure relates to the field of optical elements, and in particular, to an optical imaging system.

BACKGROUND

Nowadays, the smart phone is not only a communication device, but also an entertainment facility in people's daily life. The camera capability of smartphones is one of the focuses of people's attention. With the booming development in the smartphone field in recent years, professional photographers gradually begin to use smartphones for professional shooting. Under this trend, the market has higher and higher requirements for the imaging quality of optical imaging systems used in smart phones, etc., and major smart phone manufacturers have also put forward more new requirements for mobile phone lens assemblies.

When a traditional mobile phone lens assembly is imaging, a sharpness difference between a central area and an edge area is large, which cannot well balance the fineness of the picture, and the traditional mobile phone lens assembly is large in size, so that the shape of the mobile phone cannot meet the requirements of users.

SUMMARY

The present disclosure provides an optical imaging system, and the optical imaging system along an optical axis from an object side to an image side sequentially includes: a stop; a first lens having refractive power; a second lens having positive refractive power; a third lens having positive refractive power, an object-side surface of the third lens being a convex surface, and an image-side surface of the third lens being a convex surface; a fourth lens having refractive power, and an image-side surface of the fourth lens being a convex surface; a fifth lens having refractive power, and an image-side surface of the fifth lens being a concave surface; a sixth lens having refractive power; and a seventh lens having refractive power. Half of a maximum field-of-view Semi-FOV of the optical imaging system may satisfy: Semi-FOV≤6°; and a total effective focal length f of the optical imaging system may satisfy: f≥25 mm.

In an embodiment, at least one of the first lens to the seventh lens is a glass aspheric lens.

In an embodiment, an effective focal length f2 of the second lens and an effective focal length f4 of the fourth lens may satisfy: 1.0<|f2/f4|<7.0.

In an embodiment, an effective focal length f6 of the sixth lens and an effective focal length f7 of the seventh lens may satisfy: 0.5<|f7/f6|<2.0.

In an embodiment, an effective focal length f1 of the first lens and an effective focal length f3 of the third lens satisfy: 2.5<|f1/f3|<6.0.

In an embodiment, a radius of curvature R9 of an object-side surface of the fifth lens and a radius of curvature R10 of the image-side surface of the fifth lens satisfy: 1.3<|R10/R9|<5.8.

In an embodiment, a radius of curvature R13 of an object-side surface of the seventh lens and a radius of curvature R14 of an image-side surface of the seventh lens satisfy: 1.0<|R14/R13|<4.5.

In an embodiment, a radius of curvature R2 of an image-side surface of the first lens and a radius of curvature R3 of an object-side surface of the second lens satisfy: 1.0<|R3/R2|<2.0.

In an embodiment, a radius of curvature R6 of the image-side surface of the third lens and an abbe number V6 of the sixth lens satisfy: −3.0 mm$^{-1}$<V6/R6<−0.5 mm$^{-1}$.

In an embodiment, the total effective focal length f of the optical imaging system and a radius of curvature R5 of the object-side surface of the third lens satisfy: 2.5<f/R5<5.5.

In an embodiment, a spaced interval T56 between the image-side surface of the fifth lens and an object-side surface of the sixth lens on the optical axis and a center thickness CT6 of the sixth lens on the optical axis satisfy: 1.0<T56/CT6<6.0.

In an embodiment, a center thickness CT2 of the second lens on the optical axis and a center thickness CT7 of the seventh lens on the optical axis satisfy: 1.0<CT2/CT7<4.1.

In an embodiment, a center thickness CT1 of the first lens on the optical axis and a center thickness CT3 of the third lens on the optical axis satisfy: 0.9<CT3/CT1<2.6.

In an embodiment, the optical imaging system further comprises a reflective component arranged on the optical axis to change a propagation path of light Another aspect of the present disclosure provides an optical imaging system. The optical imaging system includes: along an optical axis from an object side to an image side, a stop, a first lens having a refractive power, a second lens having a positive refractive power; a third lens having a positive refractive power, an object-side surface of the third lens being a convex surface, and an image-side surface of the third lens being a convex surface; a fourth lens having refractive power, and an image-side surface of the fourth lens being a convex surface; a fifth lens having refractive power, and an image-side surface of the fifth lens being a concave surface; a sixth lens having a refractive power; and a seventh lens having a refractive power, a half of a maximum field-of-view Semi-FOV of the optical imaging system satisfying: Semi-FOV≤6°; and a total effective focal length f of the optical imaging system and a radius of curvature R5 of the object-side surface of the third lens satisfying: 2.5<f/R5<5.5.

In an embodiment, at least one of the first lens to the seventh lens is a glass aspheric lens.

In an embodiment, an effective focal length f2 of the second lens and an effective focal length f4 of the fourth lens satisfy: 1.0<|f2/f4|<7.0.

In an embodiment, an effective focal length f6 of the sixth lens and an effective focal length f7 of the seventh lens satisfy: 0.5<|f7/f6|<2.0.

In an embodiment, an effective focal length f1 of the first lens and an effective focal length f3 of the third lens satisfy: 2.5<|f1/f3|<6.0.

In an embodiment, a radius of curvature R9 of an object-side surface of the fifth lens and a radius of curvature R10 of the image-side surface of the fifth lens satisfy: 1.3<|R10/R9|<5.8.

In an embodiment, a radius of curvature R13 of an object-side surface of the seventh lens and a radius of curvature R14 of an image-side surface of the seventh lens satisfy: 1.0<|R14/R13|<4.5.

In an embodiment, a radius of curvature R2 of an image-side surface of the first lens and a radius of curvature R3 of an object-side surface of the second lens satisfy: 1.0<|R3/R2|<2.0.

In an embodiment, a radius of curvature R6 of the image-side surface of the third lens and an Abbe number V6 of the sixth lens satisfy: $-3.0 \text{ mm}^{-1}<V6/R6<-0.5 \text{ mm}^{-1}$.

In an embodiment, a spaced interval T56 between the image-side surface of the fifth lens and an object-side surface of the sixth lens on the optical axis and a center thickness CT6 of the sixth lens on the optical axis satisfy: 1.0<T56/CT6<6.0.

In an embodiment, a center thickness CT2 of the second lens on the optical axis and a center thickness CT7 of the seventh lens on the optical axis satisfy: 1.0<CT2/CT7<4.1.

In an embodiment, a center thickness CT1 of the first lens on the optical axis and a center thickness CT3 of the third lens on the optical axis satisfy: 0.9<CT3/CT1<2.6.

In an embodiment, the optical imaging system further comprises a reflective component arranged on the optical axis to change a propagation path of light.

In an embodiment, the total effective focal length f of the optical imaging system satisfies: f≥25 mm.

The present disclosure employs seven lenses. By reasonably distributing the refractive power of each lens, the surface shape, the center thickness of each lens and the spaced intervals along the optical axis between the lenses, the optical imaging system has at least one beneficial effect such as telephoto, high definition, or high imaging quality.

BRIEF DESCRIPTION OF THE DRAWINGS

By reading detailed description of non-limiting embodiments with reference to the following accompanying drawings, other features, objectives and advantages of the present disclosure will be more apparent:

FIG. 1 is a schematic structural diagram illustrating an optical imaging system according to Example 1 of the present disclosure;

FIGS. 2A-2D respectively illustrate a longitudinal aberration curve, an astigmatic curve, a distortion curve and a lateral color curve of the optical imaging system according to Example 1;

FIG. 3 is a schematic structural diagram illustrating an optical imaging system according to Example 2 of the present disclosure;

FIG. 5 is a schematic structural diagram illustrating an optical imaging system according to Example 3 of the present disclosure;

FIGS. 6A-6D respectively illustrate a longitudinal aberration curve, an astigmatic curve, a distortion curve and a lateral color curve of the optical imaging system according to Example 3;

FIG. 13 is a schematic structural diagram illustrating an optical imaging system according to Example 7 of the present disclosure; and FIGS. 14A-14D respectively illustrate a longitudinal aberration curve, an astigmatic curve, a distortion curve and a lateral color curve of the optical imaging system according to Example 7.

DETAILED DESCRIPTION OF EMBODIMENTS

Figure 4A:
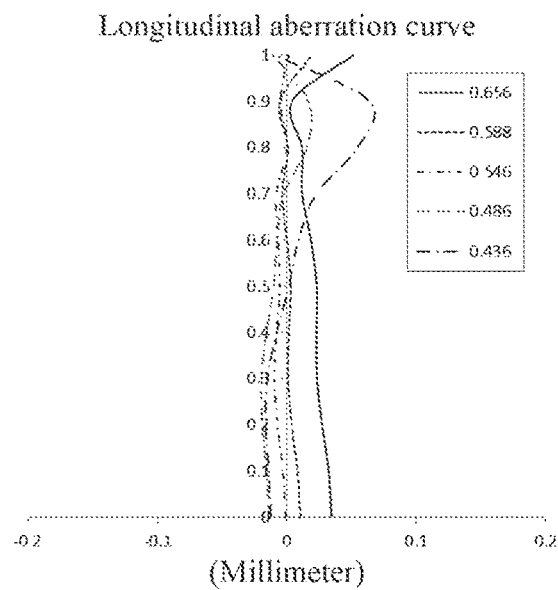
FIGS. 4A-4D respectively illustrate a longitudinal aberration curve, an astigmatic curve, a distortion curve and a lateral color curve of the optical imaging system according to Example 2.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging system according to exemplary implementations of the present disclosure may include seven lenses having refractive powers, that is, a first lens, a second lens, a third lens, a fourth lens, a fifth lens, a sixth lens and a seventh lens respectively. The seven lenses are sequentially arranged from the object side to the image side along the optical axis. There may be a spaced interval between any two adjacent lenses in the first lens to the seventh lens.

In an exemplary implementation, the first lens may have a positive refractive power or a negative refractive power; the second lens may have a positive refractive power; the third lens may have a positive refractive power, an object-side surface of the third lens may be a convex surface, and an image-side surface of the third lens may be a convex surface; the fourth lens may have a positive refractive power or a negative refractive power, and an image-side surface of the fourth lens may be a convex surface; the fifth lens may have a positive refractive power or a negative refractive power, and an image-side surface of the fifth lens may be a concave surface; the sixth lens may have a positive refractive power or a negative refractive power; and the seventh lens may have a positive refractive power or a negative refractive power.

In an exemplary implementation, the optical imaging system according to the present disclosure may satisfy: Semi-FOV≤6°, where Semi-FOV is a half of a maximum field-of-view of the optical imaging system. Satisfying Semi-FOV≤6° is conducive to making the optical imaging system have a high imaging effect, high optical performance and good processing technology.

In an exemplary implementation, the optical imaging system according to the present disclosure may satisfy: f≥25 mm, where f is a total effective focal length of the optical imaging system. More specifically, f may further satisfy: f≥26 mm. Satisfying f≥25 mm is conducive to making the optical imaging system have characteristics such as telephoto, and is conducive to achieving good imaging quality.

In an exemplary implementation, the optical imaging system according to the present disclosure may satisfy: 1.0<|f2/f4|<7.0, where f2 is an effective focal length of the second lens, and f4 is an effective focal length of the fourth lens. Satisfying 1.0<|f2/f4|<7.0 helps the optical imaging system to better balance aberrations, and at the same time is conducive to improving a system resolution.

In an exemplary implementation, the optical imaging system according to the present disclosure may satisfy: 0.5<|f7/f6|<2.0, where f6 is an effective focal length of the sixth lens, and f7 is an effective focal length of the seventh lens. More specifically, f7 and f6 may further satisfy: 0.6<|f7/f6|<1.8. Satisfying 0.5<|f7/f6|<2.0 is conducive to balancing an off-axis aberration of the system.

In an exemplary implementation, the optical imaging system according to the present disclosure may satisfy: 2.5<|f1/f3|<6.0, where f1 is an effective focal length of the first lens, and f3 is an effective focal length of the third lens. More specifically, f1 and f3 may further satisfy: 2.5<|f1/f2|<5.9. Satisfying 2.5<|f1/f3|<6.0 may effectively reduce the optical sensitivity of the first lens and the third lens, which is more conducive to mass production.

In an exemplary implementation, the optical imaging system according to the present disclosure may satisfy: 1.3<|R10/R9|<5.8, where R9 is a radius of curvature of an object-side surface of the fifth lens, and R10 a radius of curvature of the image-side surface of the fifth lens. Satisfying 1.3<|R10/R9|<5.8 is conducive to reducing the sensitivity of the system, and is conducive to reducing an angle between a chief ray and the optical axis when the chief ray is incident on an imaging plane, so as to increase the illuminance of the imaging plane, and at the same time, it may ensure that the fifth lens has good manufacturability.

In an exemplary implementation, the optical imaging system according to the present disclosure may satisfy: 1.0<|R14/R13|<4.5, where R13 is a radius of curvature of an object-side surface of the seventh lens, and R14 is a radius of curvature of an image-side surface of the seventh lens. More specifically, R14 and R13 may further satisfy: 1.3<|R14/R13|<4.5. Satisfying 1.0<|R14/R13|<4.5 is conducive to making a coma aberration between an on-axis field-of-view and the off-axis field-of-view small, so that the optical imaging system has good imaging quality.

In an exemplary implementation, the optical imaging system according to the present disclosure may satisfy: 1.0<|R3/R2|<2.0, where R2 is a radius of curvature R2 of an image-side surface of the first lens, and R3 is a radius of curvature of an object-side surface of the second lens. More specifically, R3 and R2 may further satisfy: 1.0<|R3/R2|<1.9. Satisfying 1.0<|R3/R2|<2.0 is conducive to reducing the sensitivity of the system, and is conducive to achieving characteristics such as large field-of-view and high resolution, while ensuring good manufacturability.

In an exemplary implementation, the optical imaging system according to the present disclosure may satisfy: $-3.0$ mm$^{-1}$<V6/R6<$-0.5$ mm$^{-1}$, where R6 is a radius of curvature of the image-side surface of the third lens, and V6 is an abbe number of the sixth lens. More specifically, V6 and R6 may further satisfy: $-3.0$ mm$^{-1}$<V6/R6<$-0.8$ mm$^{-1}$. Satisfying $-3.0$ mm$^{-1}$<V6/R6<$-0.5$ mm$^{-1}$ is conducive to reducing a chromatic dispersion of the system and ensuring a good imaging effect.

In an exemplary implementation, the optical imaging system according to the present disclosure may satisfy: 2.5<f/R5<5.5, where f is the total effective focal length of the optical imaging system, and R5 is a radius of curvature of the object-side surface of the third lens. More specifically, f and R5 may further satisfy: 2.7<f/R5<5.4. Satisfying 2.5<f/R5<5.5 is conducive to controlling an incident angle of off-axis field-of-view light on the imaging plane, and increasing adaptability of the system to a photosensitive element and a band-pass optical filter.

In an exemplary implementation, the optical imaging system according to the present disclosure may satisfy: 1.0<T56/CT6<6.0, where T56 is a spaced interval between the image-side surface of the fifth lens and an object-side surface of the sixth lens on the optical axis, and CT6 is a center thickness of the sixth lens on the optical axis. More specifically, T56 and CT6 may further satisfy: 1.1<T56/CT6<5.8. Satisfying 1.0<T56/CT6<6.0 may ensure the processing and assembly characteristics of the system, avoid problems such as interference of the front and rear lenses during the assembly caused by a too small gap, at the same time is conducive to reducing light deflection, adjusting a field curvature of the optical imaging system, reducing the sensitivity, and then is conducive to obtaining better imaging quality.

In an exemplary implementation, the optical imaging system according to the present disclosure may satisfy: 1.0<CT2/CT7<4.1, where CT2 is a center thickness of the second lens on the optical axis, and CT7 is a center thickness of the seventh lens on the optical axis. More specifically, CT2 and CT7 may further satisfy: 1.3<CT2/CT7<4.1. Satisfying 1.0<CT2/CT7<4.1 may ensure that the optical imaging system has good processing characteristics, and may ensure that a distance from the object-side surface of the second lens to the imaging plane on the optical axis is within a certain range.

In an exemplary implementation, the optical imaging system according to the present disclosure may satisfy: 0.9<CT3/CT1<2.6, where CT1 is a center thickness of the first lens on the optical axis, and CT3 is a center thickness of the third lens on the optical axis. Satisfying 0.9<CT3/CT1<2.6 is conducive to the injection molding of the first lens and the third lens, improving the processability of the imaging system, and may ensure good imaging quality at the same time.

In an exemplary implementation, the optical imaging system further includes a reflective component arranged on the optical axis. The reflective component may change a propagation path of light. Arranging a reflective component on the optical axis of the optical imaging system, such as arranging a reflective prism, may deflect light passing through the reflective component, making the placement of the optical imaging system more flexible, increasing the space utilization of a device installed with the optical imaging system, and making the entire device compact and flexible.

In an exemplary implementation, the optical imaging system according to the present disclosure may further include a stop arranged between the object side and the first lens. Alternatively, the above optical imaging system may further include an optical filter for correcting the color deviation and/or a cover glass for protecting the photosensitive element located on the imaging plane. The present disclosure proposes an optical imaging system having characteristics such as telephoto, high resolution, and high imaging quality. The optical imaging system according to the above implementations of the present disclosure may employ a plurality of lenses, such as the above seven lenses. By reasonably distributing the refractive power of each lens, the surface shape, the center thickness of each lens and the spaced intervals along the optical axis between the lenses, it may effectively converge incident light, reduce a total track length of the imaging lens assembly and improving the processability of the imaging lens assembly, making the optical imaging lens assembly more conducive to production and processing.

In the implementations of the present disclosure, at least one of the surfaces of the lenses is an aspheric surface, that is, at least one of the surfaces from the object-side surface of the first lens to the image-side surface of the seventh lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

In the implementations of the present disclosure, at least one of the first lens to the seventh lens is a glass aspheric lens. The glass aspheric lens may make the entire optical imaging system have a good temperature drift effect. At different temperatures, the MTF (Modulation Transfer Function) of the optical imaging system is relatively stable, and a back focus offset is small.

However, it should be understood by those skilled in the art that the various results and advantages described in the present specification may be obtained by changing the number of the lenses constituting the optical imaging system without departing from the technical solution claimed by the present disclosure. For example, although the optical imaging system having seven lenses is described as an example in the implementations, the optical imaging system is not limited to include seven lenses. If desired, the optical imaging system may also include other numbers of lenses.

Specific examples of the optical imaging system that may be applied to the above implementations are further described below with reference to the accompanying drawings.

Example 1

An optical imaging system according to Example 1 of the present disclosure is described below with reference to FIGS. 1-2D. FIG. 1 is a schematic structural diagram illustrating the optical imaging system according to Example 1 of the present disclosure.

As shown in FIG. 1, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a concave surface, and an image-side surface S12 of the sixth lens is a concave surface. The seventh lens E7 has a negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging system of Example 1, where the units for the radius of curvature, the thickness/distance and the focal length are millimeter (mm).

In this example, a total effective focal length f of the optical imaging system is 27.00 mm, a total track length TTL of the optical imaging system (that is, a distance from the object-side surface S1 of the first lens E1 to the imaging plane S17 of the optical imaging system on the optical axis) is 28.00 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.72.

In Example 1, the object-side surface and the image-side surface of each of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \Sigma A_i h^i \tag{1}$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S14 in Example 1.

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 9.2804 | 3.0000 | 1.55 | 56.1 | −24.48 | 0.0000 |
| S2 | Aspheric | 4.8538 | 0.3912 | | | | −0.8485 |
| S3 | Aspheric | 5.7510 | 1.1902 | 1.66 | 21.5 | 200.50 | 0.2321 |
| S4 | Aspheric | 5.5193 | 0.7500 | | | | 0.2489 |
| S5 | Aspheric | 5.0471 | 3.0000 | 1.50 | 81.6 | 8.20 | −0.0896 |
| S6 | Aspheric | −17.2926 | 0.7168 | | | | −14.3695 |
| S7 | Aspheric | 68.8407 | 0.7446 | 1.55 | 56.1 | 49.53 | 99.0000 |
| S8 | Aspheric | −44.4425 | 0.4610 | | | | 49.0830 |
| S9 | Aspheric | −14.2013 | 3.0000 | 1.64 | 23.9 | −18.07 | 1.6603 |
| S10 | Aspheric | 68.3127 | 3.0738 | | | | −99.0000 |
| S11 | Aspheric | −11.8659 | 1.0497 | 1.66 | 21.5 | 17.93 | 8.2097 |
| S12 | Aspheric | −6.1237 | 0.3000 | | | | −5.7389 |
| S13 | Aspheric | −8.4236 | 0.3192 | 1.55 | 56.1 | −11.44 | −64.8317 |
| S14 | Aspheric | 24.6090 | 9.2933 | | | | −7.5994 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 2

| Surface number | A4 | A6 | A8 | A10 | A12 | A14 | A16 | A18 | A20 |
|---|---|---|---|---|---|---|---|---|---|
| S1 | −3.5170E−04 | −1.7495E−05 | −1.1791E−07 | −1.3195E−08 | 9.7407E−10 | 0.0000E+00 | 0.0000E+00 | 0.0000E+00 | 0.0000E+00 |
| S2 | 1.4738E−04 | −6.0275E−05 | −3.4457E−06 | 1.6967E−07 | 3.1165E−09 | 0.0000E+00 | 0.0000E+00 | 0.0000E+00 | 0.0000E+00 |
| S3 | −5.8603E−04 | −3.0151E−05 | 1.9773E−06 | 1.8318E−07 | −1.3111E−08 | 0.0000E+00 | 0.0000E+00 | 0.0000E+00 | 0.0000E+00 |
| S4 | −1.1184E−03 | −1.0780E−05 | 2.2080E−06 | 4.9268E−07 | −3.0208E−08 | −6.0130E−10 | 0.0000E+00 | 0.0000E+00 | 0.0000E+00 |
| S5 | −6.4484E−04 | −2.0102E−05 | −2.3859E−06 | 1.4006E−08 | −8.4204E−09 | 0.0000E+00 | 0.0000E+00 | 0.0000E+00 | 0.0000E+00 |
| S6 | −6.9756E−04 | 2.0131E−05 | −1.0014E−07 | −2.8004E−07 | 7.2492E−09 | 0.0000E+00 | 0.0000E+00 | 0.0000E+00 | 0.0000E+00 |
| S7 | −5.3801E−04 | −6.2152E−05 | 6.2377E−06 | 2.3184E−06 | −1.6954E−07 | 0.0000E+00 | 0.0000E+00 | 0.0000E+00 | 0.0000E+00 |
| S8 | −9.7137E−05 | −1.0381E−04 | −1.5579E−06 | 2.2095E−06 | −1.8233E−07 | 0.0000E+00 | 0.0000E+00 | 0.0000E+00 | 0.0000E+00 |
| S9 | 7.5959E−04 | −6.3481E−05 | −1.1951E−05 | −1.3274E−06 | 1.1623E−07 | 0.0000E+00 | 0.0000E+00 | 0.0000E+00 | 0.0000E+00 |
| S10 | 1.1228E−03 | −4.6947E−05 | −6.7384E−06 | −5.6690E−06 | 9.0910E−07 | −3.9935E−08 | 0.0000E+00 | 0.0000E+00 | 0.0000E+00 |
| S11 | −2.9679E−03 | 7.8894E−04 | −1.0673E−03 | 9.0540E−04 | −5.0899E−04 | 1.7747E−04 | −3.7254E−05 | 4.3394E−06 | −2.1558E−07 |
| S12 | −6.4527E−03 | 3.7128E−03 | −4.8906E−03 | 3.8388E−03 | −1.8521E−03 | 5.5083E−04 | −9.8608E−05 | 9.7363E−06 | −4.0635E−07 |

TABLE 2-continued

| Surface number | A4 | A6 | A8 | A10 | A12 | A14 | A16 | A18 | A20 |
|---|---|---|---|---|---|---|---|---|---|
| S13 | −2.7621E−02 | 1.5451E−02 | −1.4375E−02 | 1.0388E−02 | −4.9207E−03 | 1.4719E−03 | −2.6837E−04 | 2.7124E−05 | −1.1573E−06 |
| S14 | −1.2746E−02 | 4.5675E−03 | −3.6985E−03 | 2.4431E−03 | −1.0321E−03 | 2.6892E−04 | −4.2220E−05 | 3.6489E−06 | −1.3137E−07 |

FIG. 2A illustrates the longitudinal aberration curve of the optical imaging system according to Example 1, representing deviations of focal points converged by light of different wavelengths after passing through the lens assembly. FIG. 2B illustrates the astigmatic curve of the optical imaging system according to Example 1, representing a curvature of a tangential plane and a curvature of a sagittal plane. FIG. 2C illustrates the distortion curve of the optical imaging system according to Example 1, representing the amounts of distortion corresponding to different image heights. FIG. 2D illustrates the lateral color curve of the optical imaging system according to Example 1, representing deviations of different heights images on an imaging plane formed by lights passing through the lens assembly. It can be seen from FIG. 2A to FIG. 2D that the optical imaging system provided in Example 1 can achieve good imaging quality.

Example 2

An optical imaging system according to Example 2 of the present disclosure is described below with reference to FIG. 3 to FIG. 4D. In this example and the following examples, for the purpose of brevity, the description of parts similar to those in Example 1 will be omitted. FIG. 3 illustrates a schematic structural diagram of the optical imaging system according to Example 2 of the present disclosure.

As shown in FIG. 3, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a positive refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a negative refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a concave surface, and an image-side surface S12 of the sixth lens is a convex surface. The seventh lens E7 has a negative refractive power, an object-side surface S13 of the seventh lens is a concave surface, and an image-side surface S14 of the seventh lens is a convex surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 26.83 mm, a total track length TTL of the optical imaging system is 27.83 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.73.

Table 3 is a table illustrating basic parameters of the optical imaging system of Example 2, where the units for the radius of curvature, the thickness/distance and the focal length are millimeter (mm). Table 4 shows high-order coefficients applicable to each aspheric surface in Example 2, where the surface shape of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 13.3800 | 3.0000 | 1.55 | 56.1 | 51.01 | 0.0000 |
| S2 | Aspheric | 23.6884 | 0.4069 | | | | 2.3653 |
| S3 | Aspheric | 42.5893 | 2.0528 | 1.66 | 21.5 | 207.88 | −39.4399 |
| S4 | Aspheric | 60.6622 | 0.7500 | | | | 32.9749 |
| S5 | Aspheric | 9.6467 | 2.9642 | 1.50 | 81.6 | 8.78 | −0.0573 |
| S6 | Aspheric | −7.2005 | 0.3000 | | | | −6.4719 |
| S7 | Aspheric | −14.3897 | 1.2795 | 1.55 | 56.1 | −36.95 | −32.7961 |
| S8 | Aspheric | −51.6597 | 0.4814 | | | | 38.6890 |
| S9 | Aspheric | −7.7892 | 2.3146 | 1.64 | 23.9 | −9.37 | −11.1850 |
| S10 | Aspheric | 29.4196 | 1.2746 | | | | 99.0000 |
| S11 | Aspheric | −4.8536 | 0.8971 | 1.66 | 21.5 | 15.22 | −12.5230 |
| S12 | Aspheric | −3.5092 | 0.3565 | | | | −5.5637 |
| S13 | Aspheric | −4.7799 | 0.5747 | 1.55 | 56.1 | −15.09 | −17.6839 |
| S14 | Aspheric | −11.8496 | 10.4672 | | | | −24.8764 |
| S15 | Spherical | Infinite | 0.1100 | 1.62 | 64.2 | | |

TABLE 3-continued

| Surface number | Surface type | Radius of curvature | Thickness/ Distance | Material | | Focal length | Conic coefficient |
|---|---|---|---|---|---|---|---|
| | | | | Refractive index | Abbe number | | |
| S16 | Spherical | Infinite | 0.6001 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −7.1029E−05 | −1.4635E−05 | −4.1024E−07 | −2.4948E−08 | 6.8163E−10 | 0.0000E+00 | 0.0000E+00 | 0.0000E+00 | 0.0000E+00 |
| S2 | 8.7451E−05 | −4.9461E−05 | −2.8859E−06 | 1.6340E−07 | −8.3920E−10 | 0.0000E+00 | 0.0000E+00 | 0.0000E+00 | 0.0000E+00 |
| S3 | −5.5401E−04 | −3.2168E−05 | 2.1106E−06 | 2.1371E−07 | −1.1996E−08 | 0.0000E+00 | 0.0000E+00 | 0.0000E+00 | 0.0000E+00 |
| S4 | −1.0632E−03 | −4.5321E−06 | 1.9597E−06 | 4.3469E−07 | −3.1387E−08 | 1.2728E−10 | 0.0000E+00 | 0.0000E+00 | 0.0000E+00 |
| S5 | −4.4574E−04 | −4.5421E−05 | −3.1976E−06 | 4.9442E−08 | −7.4054E−09 | 0.0000E+00 | 0.0000E+00 | 0.0000E+00 | 0.0000E+00 |
| S6 | −9.6449E−04 | 4.3455E−06 | −6.0229E−07 | −2.6170E−07 | 8.2791E−09 | 0.0000E+00 | 0.0000E+00 | 0.0000E+00 | 0.0000E+00 |
| S7 | −1.6609E−04 | −3.4116E−05 | 4.4224E−06 | 1.7814E−06 | −2.4051E−07 | 0.0000E+00 | 0.0000E+00 | 0.0000E+00 | 0.0000E+00 |
| S8 | −5.4556E−04 | −1.7123E−04 | −3.2280E−06 | 2.1044E−06 | −2.4307E−07 | 0.0000E+00 | 0.0000E+00 | 0.0000E+00 | 0.0000E+00 |
| S9 | 1.1257E−03 | −1.4615E−05 | −1.8136E−05 | −1.5397E−06 | 3.5314E−07 | 0.0000E+00 | 0.0000E+00 | 0.0000E+00 | 0.0000E+00 |
| S10 | 1.2293E−02 | 1.4818E−04 | 8.3751E−05 | 9.5862E−07 | 2.2442E−08 | −2.8471E−07 | 0.0000E+00 | 0.0000E+00 | 0.0000E+00 |
| S11 | 1.5284E−03 | 1.2315E−03 | −1.0249E−03 | 9.1309E−04 | −5.0816E−04 | 1.7745E−04 | −3.7280E−05 | 4.3340E−06 | −2.1614E−07 |
| S12 | −6.2056E−03 | 3.8872E−03 | −4.8615E−03 | 3.8408E−03 | −1.8519E−03 | 5.5085E−04 | −9.8607E−05 | 9.7352E−06 | −4.0682E−07 |
| S13 | −2.7191E−02 | 1.5658E−02 | −1.4366E−02 | 1.0387E−02 | −4.9212E−03 | 1.4718E−03 | −2.6838E−04 | 2.7126E−05 | −1.1561E−06 |
| S14 | −1.1025E−02 | 4.4285E−03 | −3.6985E−03 | 2.4452E−03 | −1.0319E−03 | 2.6891E−04 | −4.2225E−05 | 3.6481E−06 | −1.3162E−07 |

Figure 4B:
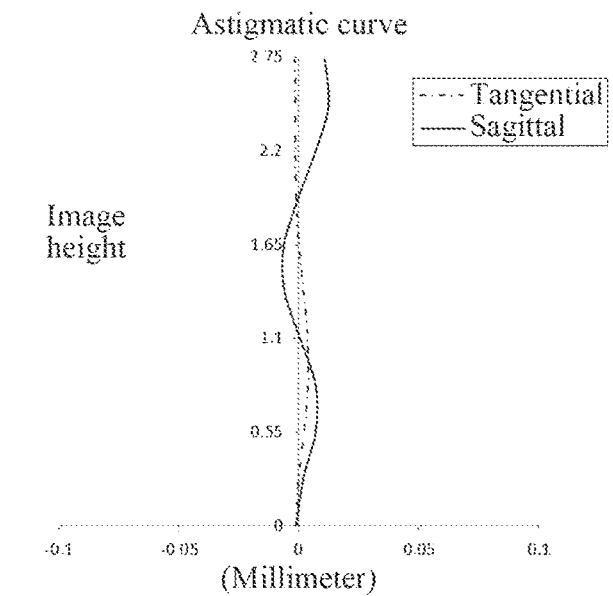
Figure 4C:
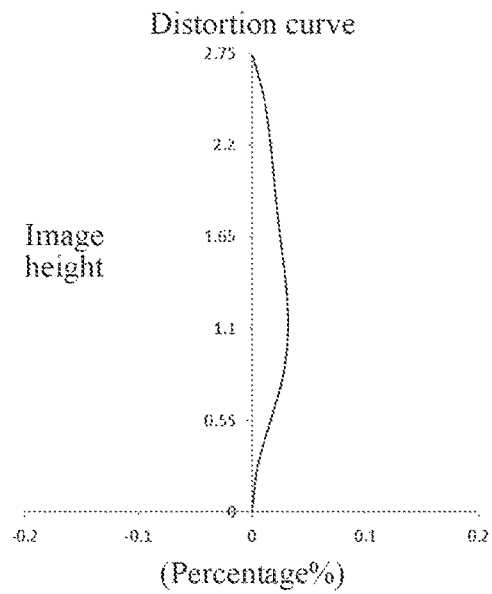
Figure 4D:
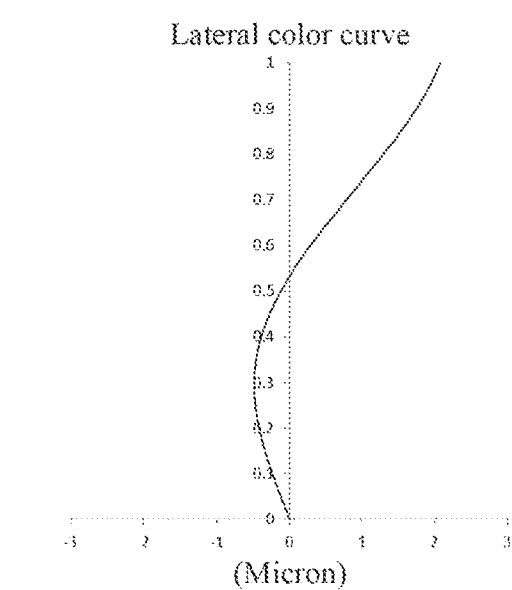

FIG. 4A illustrates the longitudinal aberration curve of the optical imaging system according to Example 2, representing deviations of focal points converged by light of different wavelengths after passing through the lens assembly. FIG. 4B illustrates the astigmatic curve of the optical imaging system according to Example 2, representing a curvature of a tangential plane and a curvature of a sagittal plane. FIG. 4C illustrates the distortion curve of the optical imaging system according to Example 2, representing the amounts of distortion corresponding to different image heights. FIG. 4D illustrates the lateral color curve of the optical imaging system according to Example 2, representing deviations of different heights of images on an imaging plane formed by light passing through the lens assembly. It can be seen from FIG. 4A to FIG. 4D that the optical imaging system provided in Example 2 can achieve good imaging quality.

Example 3

An optical imaging system according to Example 3 of the present disclosure is described below with reference to FIG. 5 to FIG. 6D. FIG. 5 illustrates a schematic structural diagram of the optical imaging system according to Example 3 of the present disclosure.

As shown in FIG. 5, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a negative refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a concave surface, and an image-side surface S12 of the sixth lens is a convex surface. The seventh lens E7 has a negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 26.97 mm, a total track length TTL of the optical imaging system is 27.97 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.73.

Table 5 is a table illustrating basic parameters of the optical imaging system of Example 3, where the units for the radius of curvature, the thickness/distance and the focal length are millimeter (mm). Table 6 shows high-order coefficients applicable to each aspheric surface in Example 3, where the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 9.4282 | 3.0000 | 1.55 | 56.1 | −24.41 | 0.0000 |
| S2 | Aspheric | 4.9032 | 0.4184 | | | | −0.8764 |
| S3 | Aspheric | 5.9905 | 1.3148 | 1.66 | 21.5 | 199.81 | 0.2142 |
| S4 | Aspheric | 5.7298 | 0.7500 | | | | 0.2570 |
| S5 | Aspheric | 5.0462 | 3.0000 | 1.50 | 81.6 | 6.90 | −0.0840 |
| S6 | Aspheric | −8.6773 | 0.6805 | | | | −11.8566 |
| S7 | Aspheric | −20.9386 | 0.6541 | 1.55 | 56.1 | −45.01 | −99.0000 |
| S8 | Aspheric | −142.2183 | 0.4521 | | | | 99.0000 |
| S9 | Aspheric | −18.5486 | 3.0000 | 1.64 | 23.9 | −22.51 | −7.4232 |
| S10 | Aspheric | 69.3534 | 3.6543 | | | | 99.0000 |
| S11 | Aspheric | −12.6414 | 1.1288 | 1.66 | 21.5 | 18.55 | 7.1043 |
| S12 | Aspheric | −6.4303 | 0.3334 | | | | −6.5916 |
| S13 | Aspheric | −9.0330 | 0.3220 | 1.55 | 56.1 | −11.77 | −78.5643 |
| S14 | Aspheric | 22.6486 | 8.5465 | | | | −13.6496 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −3.2662E−04 | −1.7854E−05 | −2.1864E−07 | −1.5342E−08 | 1.2366E−09 | 0.0000E+00 | 0.0000E+00 | 0.0000E+00 | 0.0000E+00 |
| S2 | 1.1345E−04 | −6.1258E−05 | −3.5475E−06 | 1.6893E−07 | 3.9427E−09 | 0.0000E+00 | 0.0000E+00 | 0.0000E+00 | 0.0000E+00 |
| S3 | −6.0988E−04 | −3.1440E−05 | 2.0032E−06 | 1.8271E−07 | −1.3689E−08 | 0.0000E+00 | 0.0000E+00 | 0.0000E+00 | 0.0000E+00 |
| S4 | −1.0856E−03 | −1.0114E−05 | 1.8610E−06 | 4.6992E−07 | −3.0317E−08 | −5.5109E−10 | 0.0000E+00 | 0.0000E+00 | 0.0000E+00 |
| S5 | −6.3338E−04 | −1.9797E−05 | −2.2002E−06 | 1.0773E−08 | −9.9014E−09 | 0.0000E+00 | 0.0000E+00 | 0.0000E+00 | 0.0000E+00 |
| S6 | −7.0765E−04 | 2.0134E−05 | −1.0145E−07 | −2.7718E−07 | 4.5186E−09 | 0.0000E+00 | 0.0000E+00 | 0.0000E+00 | 0.0000E+00 |
| S7 | −4.6041E−04 | −6.6414E−05 | 5.5826E−06 | 2.1887E−06 | −1.7496E−07 | 0.0000E+00 | 0.0000E+00 | 0.0000E+00 | 0.0000E+00 |
| S8 | −2.5541E−04 | −1.0601E−04 | −1.7496E−06 | 2.2920E−06 | −1.7980E−07 | 0.0000E+00 | 0.0000E+00 | 0.0000E+00 | 0.0000E+00 |
| S9 | 7.4685E−04 | −6.7461E−05 | −1.1939E−05 | −1.3633E−06 | 1.3031E−07 | 0.0000E+00 | 0.0000E+00 | 0.0000E+00 | 0.0000E+00 |
| S10 | 1.0500E−03 | −2.6768E−05 | −6.9984E−06 | −5.9232E−06 | 8.8117E−07 | −3.8890E−08 | 0.0000E+00 | 0.0000E+00 | 0.0000E+00 |
| S11 | −2.8812E−03 | 8.1463E−04 | −1.0532E−03 | 9.0620E−04 | −5.0905E−04 | 1.7744E−04 | −3.7258E−05 | 4.3389E−06 | −2.1561E−07 |
| S12 | −6.2145E−03 | 3.7515E−03 | −4.8837E−03 | 3.8398E−03 | −1.8520E−03 | 5.5083E−04 | −9.8609E−05 | 9.7360E−06 | −4.0641E−07 |
| S13 | −2.7345E−02 | 1.5452E−02 | −1.4379E−02 | 1.0388E−02 | −4.9207E−03 | 1.4719E−03 | −2.6837E−04 | 2.7124E−05 | −1.1572E−06 |
| S14 | −1.2773E−02 | 4.5764E−03 | −3.7001E−03 | 2.4422E−03 | −1.0322E−03 | 2.6891E−04 | −4.2219E−05 | 3.6495E−06 | −1.3129E−07 |

Figures 6C, 6D:
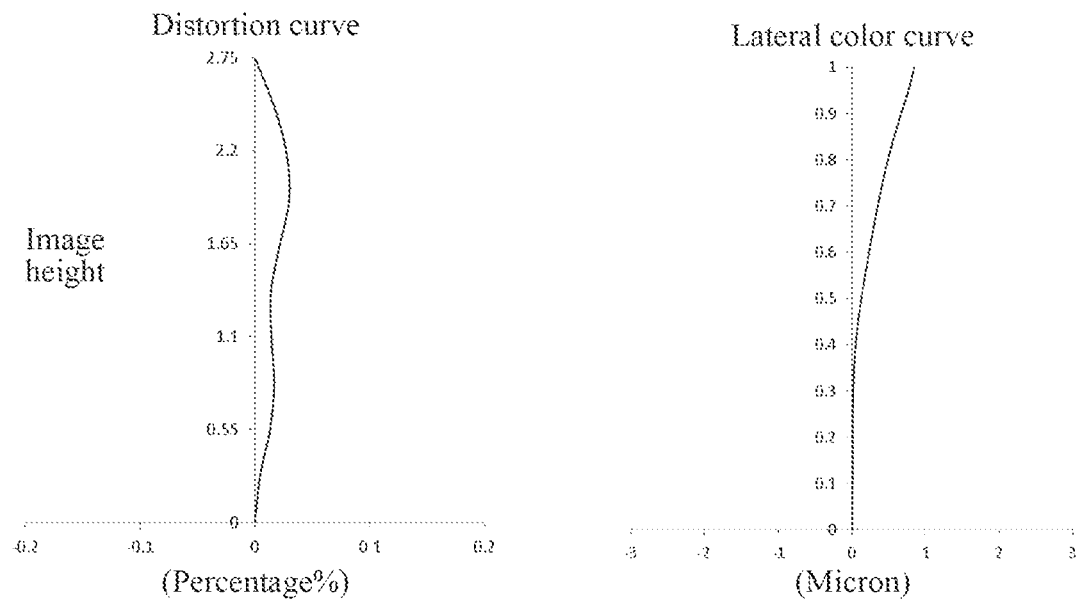

FIG. 6A illustrates the longitudinal aberration curve of the optical imaging system according to Example 3, representing deviations of focal points converged by light of different wavelengths after passing through the lens assembly. FIG. 6B illustrates the astigmatic curve of the optical imaging system according to Example 3, representing a curvature of a tangential plane and a curvature of a sagittal plane. FIG. 6C illustrates the distortion curve of the optical imaging system according to Example 3, representing the amounts of distortion corresponding to different image heights. FIG. 6D illustrates the lateral color curve of the optical imaging system according to Example 3, representing deviations of different heights of images on an imaging plane formed by light passing through the lens assembly. It can be seen from FIG. 6A to FIG. 6D that the optical imaging system provided in Example 3 can achieve good imaging quality.

Example 4

Figure 7:
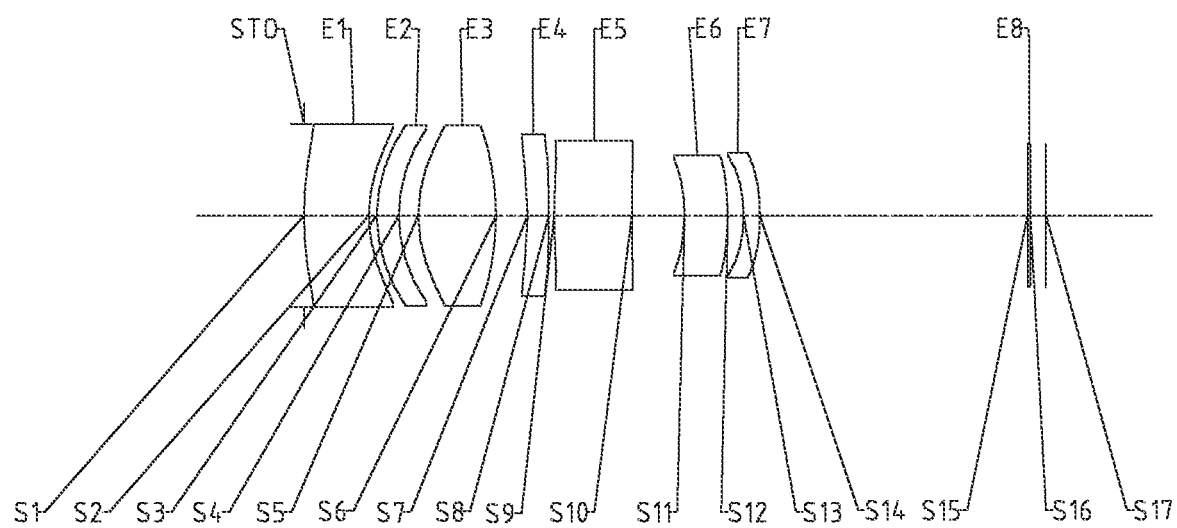
FIG. 7 is a schematic structural diagram illustrating an optical imaging system according to Example 4 of the present disclosure.

An optical imaging system according to Example 4 of the present disclosure is described below with reference to FIG. 7 to FIG. 8D. FIG. 7 illustrates a schematic structural diagram of the optical imaging system according to Example 4 of the present disclosure.

As shown in FIG. 7, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a negative refractive power, an object-side surface S7 of the fourth lens is a concave surface, and an image-side surface S8 of the fourth lens is a convex surface. The fifth lens E5 has a positive refractive power, an object-side surface S9 of the fifth lens is a convex surface, and an image-side surface S10 of the fifth lens is a concave surface. The sixth lens E6 has a negative refractive power, an object-side surface S11 of the sixth lens is a concave surface, and an image-side surface S12 of the sixth lens is a convex surface. The seventh lens E7 has a negative refractive power, an object-side surface S13 of the seventh lens is a concave surface, and an image-side surface S14 of the seventh lens is a convex surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 26.04 mm, a total track length TTL of the optical imaging system is 28.61 mm, a half of a diagonal length ImgH of an effective pixel area on the imaging plane S17 of the optical imaging system is 2.75 mm, a half of a maximum field-of-view Semi-FOV of the optical imaging system is 6.0°, and an F number Fno of the optical imaging system is 3.73.

Table 7 is a table illustrating basic parameters of the optical imaging system of Example 4, where the units for the radius of curvature, the thickness/distance and the focal length are millimeter (mm). Table 8 shows high-order coefficients applicable to each aspheric surface in Example 4, where the surface shape of each aspheric surface may be defined by the formula (1) given in the above Example 1.

Figure 8A:
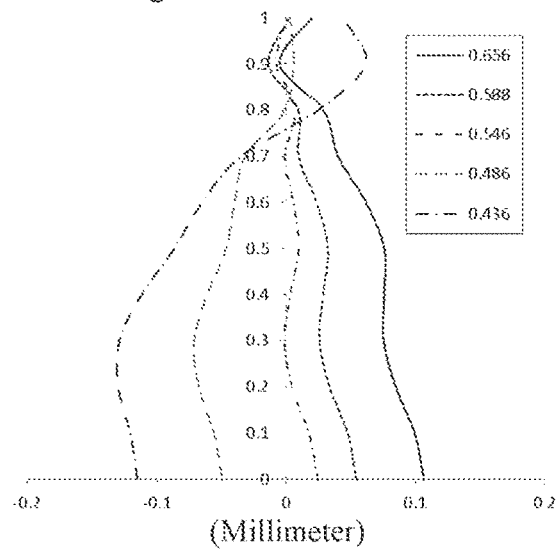
FIGS. 8A-8D respectively illustrate a longitudinal aberration curve, an astigmatic curve, a distortion curve and a lateral color curve of the optical imaging system according to Example 4.
Figure 8B:
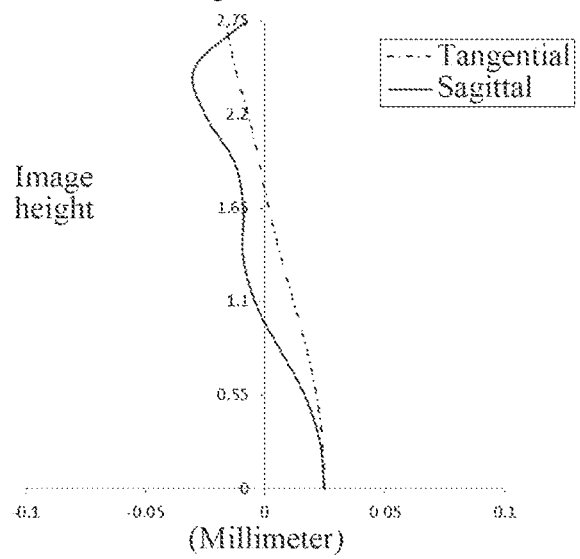
Figure 8C:
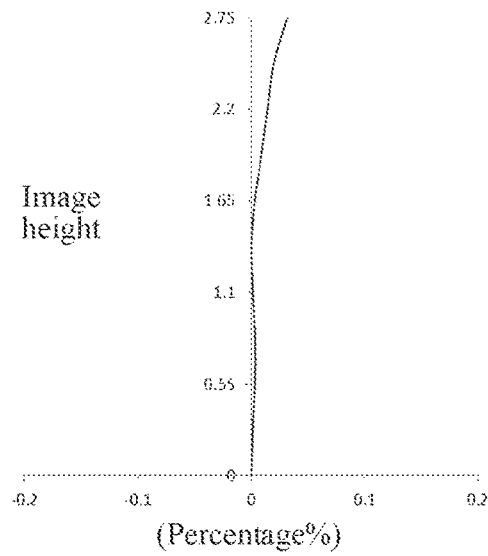
Figure 8D:
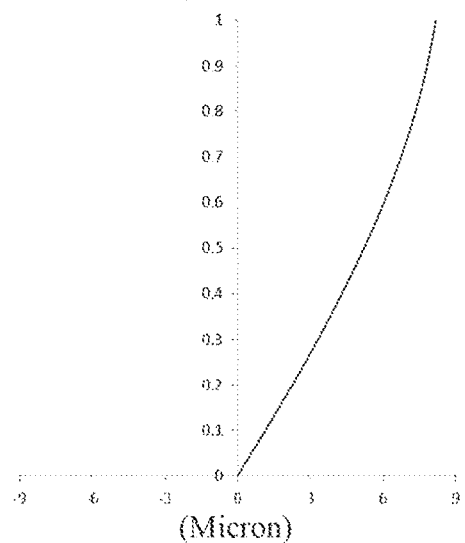

FIG. 8A illustrates the longitudinal aberration curve of the optical imaging system according to Example 4, representing deviations of focal points converged by light of different wavelengths after passing through the lens assembly. FIG. 8B illustrates the astigmatic curve of the optical imaging system according to Example 4, representing a curvature of a tangential plane and a curvature of a sagittal plane. FIG. 8C illustrates the distortion curve of the optical imaging system according to Example 4, representing the amounts of distortion corresponding to different image heights. FIG. 8D illustrates the lateral color curve of the optical imaging system according to Example 4, representing deviations of different heights of images on an imaging plane formed by light passing through the lens assembly. It can be seen from FIG. 8A to FIG. 8D that the optical imaging system provided in Example 4 can achieve good imaging quality.

Example 5

An optical imaging system according to Example 5 of the present disclosure is described below with reference to FIG.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 12.7208 | 2.5029 | 1.55 | 56.1 | −20.08 | 0.0000 |
| S2 | Aspheric | 5.4812 | 0.3085 | | | | −0.9814 |
| S3 | Aspheric | 5.6834 | 0.8457 | 1.66 | 21.5 | 209.60 | 0.1521 |
| S4 | Aspheric | 5.5776 | 0.7500 | | | | 0.2983 |
| S5 | Aspheric | 5.5935 | 3.0000 | 1.50 | 81.6 | 7.72 | 0.0025 |
| S6 | Aspheric | −10.1272 | 1.2159 | | | | −14.1331 |
| S7 | Aspheric | −12.8026 | 0.8233 | 1.55 | 56.1 | −30.46 | −44.1638 |
| S8 | Aspheric | −56.7012 | 0.1994 | | | | 99.0000 |
| S9 | Aspheric | 24.5379 | 3.0000 | 1.64 | 23.9 | 56.11 | −99.0000 |
| S10 | Aspheric | 73.3656 | 2.0273 | | | | 99.0000 |
| S11 | Aspheric | −6.9297 | 1.6685 | 1.66 | 21.5 | −29.91 | 2.7309 |
| S12 | Aspheric | −11.7180 | 0.6090 | | | | −12.6786 |
| S13 | Aspheric | −6.2851 | 0.6308 | 1.55 | 56.1 | −49.78 | −40.1892 |
| S14 | Aspheric | −8.4635 | 10.3195 | | | | −47.1760 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −4.0823E−04 | −2.5043E−05 | −8.6343E−08 | 1.1192E−09 | 9.4157E−10 | 0.0000E+00 | 0.0000E+00 | 0.0000E+00 | 0.0000E+00 |
| S2 | 2.0575E−05 | −6.4767E−05 | −3.7327E−06 | 1.7112E−07 | 6.1141E−09 | 0.0000E+00 | 0.0000E+00 | 0.0000E+00 | 0.0000E+00 |
| S3 | −7.5505E−04 | −3.1093E−05 | 2.1812E−06 | 1.9580E−07 | −1.2945E−08 | 0.0000E+00 | 0.0000E+00 | 0.0000E+00 | 0.0000E+00 |
| S4 | −9.5170E−04 | −1.2494E−05 | 1.8798E−06 | 4.7894E−07 | −3.0050E−08 | −5.7108E−10 | 0.0000E+00 | 0.0000E+00 | 0.0000E+00 |
| S5 | −4.7073E−04 | −1.4565E−05 | −2.5427E−06 | −2.3332E−08 | −1.1237E−08 | 0.0000E+00 | 0.0000E+00 | 0.0000E+00 | 0.0000E+00 |
| S6 | −8.0877E−04 | 1.5505E−05 | 1.4438E−07 | −2.6024E−07 | 5.0473E−09 | 0.0000E+00 | 0.0000E+00 | 0.0000E+00 | 0.0000E+00 |
| S7 | −3.3580E−04 | −5.1007E−05 | 5.7610E−06 | 2.2658E−06 | −1.6506E−07 | 0.0000E+00 | 0.0000E+00 | 0.0000E+00 | 0.0000E+00 |
| S8 | −3.2332E−04 | −1.1976E−04 | −9.9563E−07 | 2.3488E−06 | −1.7040E−07 | 0.0000E+00 | 0.0000E+00 | 0.0000E+00 | 0.0000E+00 |
| S9 | 5.1938E−04 | −5.0797E−05 | −1.2296E−05 | −1.4452E−06 | 1.1124E−06 | 0.0000E+00 | 0.0000E+00 | 0.0000E+00 | 0.0000E+00 |
| S10 | 1.2314E−03 | −9.1550E−05 | −1.1756E−05 | −6.1704E−06 | 8.6182E−07 | −4.4928E−08 | 0.0000E+00 | 0.0000E+00 | 0.0000E+00 |
| S11 | −1.1066E−03 | 9.2312E−04 | −1.0357E−03 | 9.0840E−04 | −5.0915E−04 | 1.7736E−04 | −3.7278E−05 | 4.3358E−06 | −2.1599E−07 |
| S12 | −5.2329E−03 | 3.9145E−03 | −4.8710E−03 | 3.8401E−03 | −1.8521E−03 | 5.5079E−04 | −9.8616E−05 | 9.7352E−06 | −4.0641E−07 |
| S13 | −2.7090E−02 | 1.5404E−02 | −1.4391E−02 | 1.0386E−02 | −4.9207E−03 | 1.4720E−03 | −2.6837E−04 | 2.7124E−05 | −1.1573E−06 |
| S14 | −1.2816E−02 | 4.5218E−03 | −3.6940E−03 | 2.4436E−03 | −1.0321E−03 | 2.6891E−04 | −4.2223E−05 | 3.6483E−06 | −1.3159E−07 |

Figure 9:
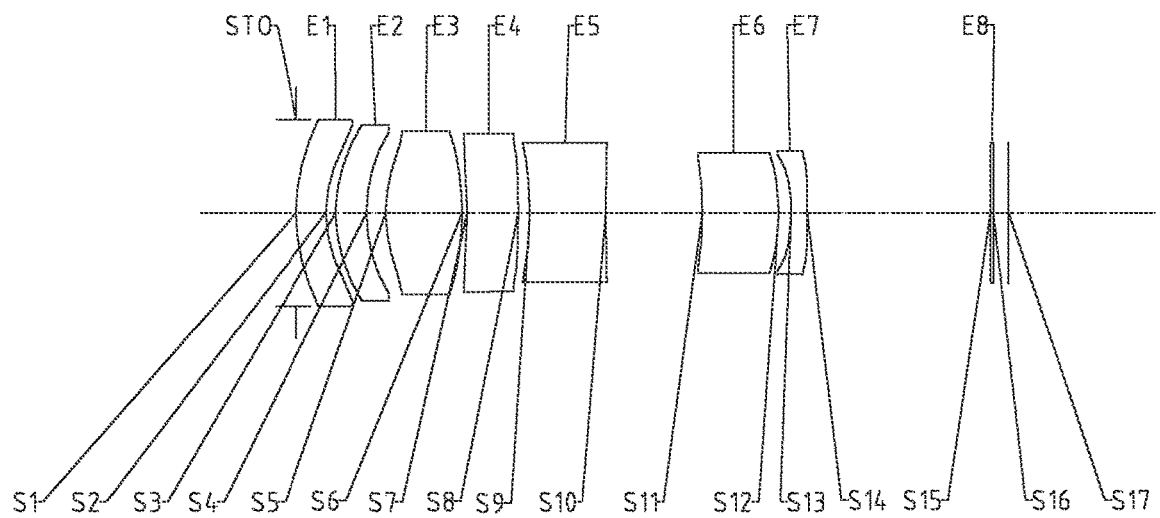
FIG. 9 is a schematic structural diagram illustrating an optical imaging system according to Example 5 of the present disclosure.
Figures 10A, 10B:
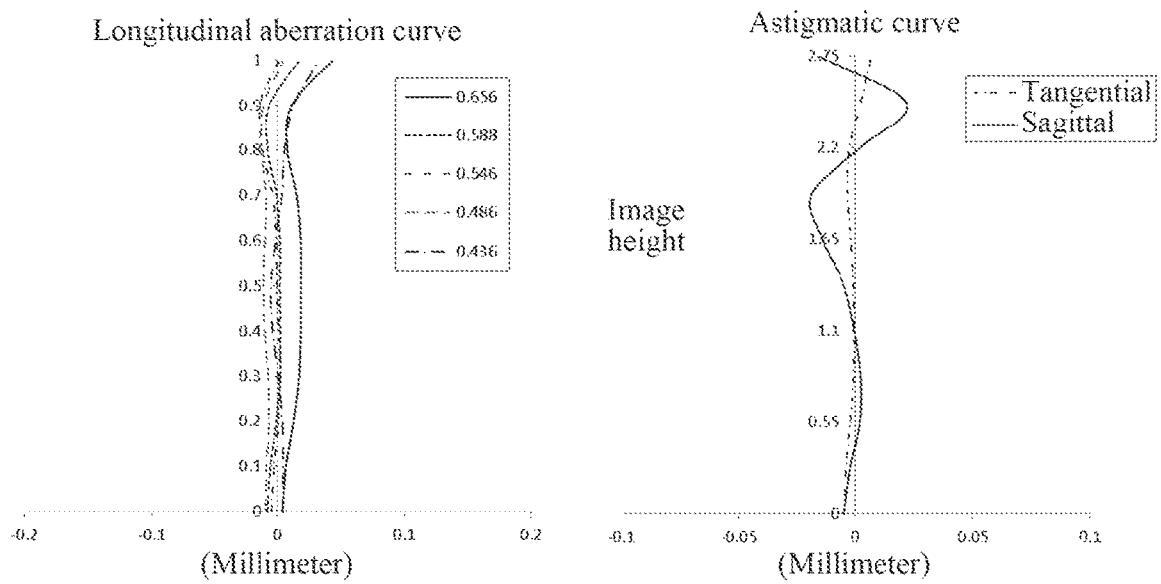
FIGS. 10A-10D respectively illustrate a longitudinal aberration curve, an astigmatic curve, a distortion curve and a lateral color curve of the optical imaging system according to Example 5.
Figures 10C, 10D:
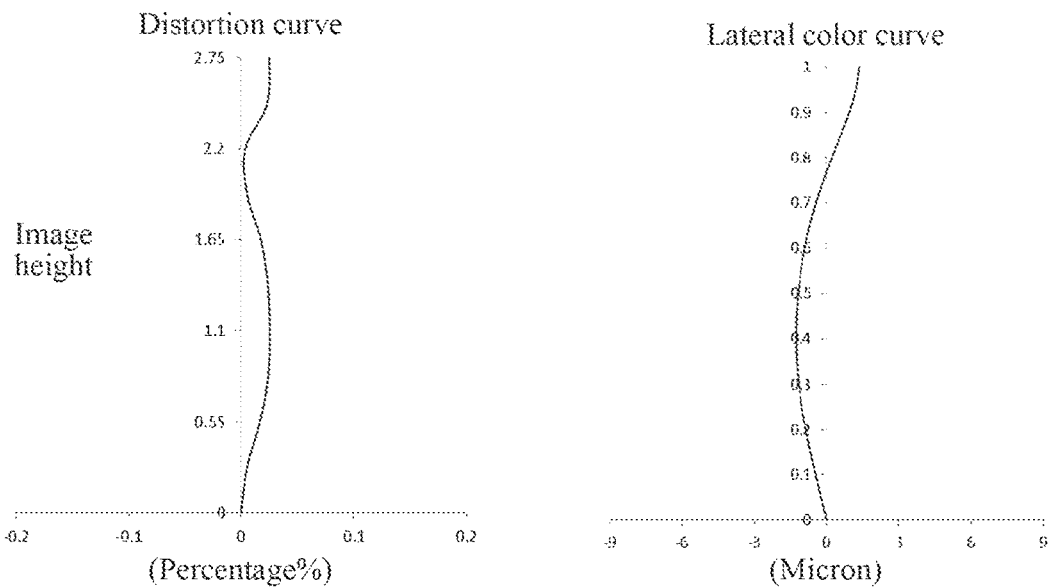

9 to FIG. 10D. FIG. 9 illustrates a schematic structural diagram of the optical imaging system according to Example 5 of the present disclosure.

As shown in FIG. 9, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a negative refractive power, an object-side surface S7 of the fourth lens is a concave surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a concave surface, and an image-side surface S12 of the sixth lens is a convex surface. The seventh lens E7 has a negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 27.00 mm, a total track length TTL of the optical imaging system is 28.00 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.73.

Table 9 is a table illustrating basic parameters of the optical imaging system of Example 5, where the units for the radius of curvature, the thickness/distance and the focal length are millimeter (mm). Table 10 shows high-order coefficients applicable to each aspheric surface in Example 5, where the surface shape of each aspheric surface may be defined by the formula (1) given in the above Example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 7.7834 | 1.1714 | 1.55 | 56.1 | −27.74 | 0.0000 |
| S2 | Aspheric | 4.8694 | 0.3820 | | | | −1.2390 |
| S3 | Aspheric | 5.8658 | 1.2094 | 1.66 | 21.5 | 74.39 | 0.0480 |
| S4 | Aspheric | 6.1191 | 0.7500 | | | | 0.4730 |
| S5 | Aspheric | 5.5854 | 3.0000 | 1.50 | 81.6 | 7.58 | −0.8351 |
| S6 | Aspheric | −9.5950 | 0.2000 | | | | −20.6280 |
| S7 | Aspheric | −19.6833 | 2.0034 | 1.55 | 56.1 | −61.45 | −95.9149 |
| S8 | Aspheric | −49.2686 | 0.4537 | | | | 99.0000 |
| S9 | Aspheric | −12.2428 | 3.0000 | 1.64 | 23.9 | −16.03 | −14.6117 |
| S10 | Aspheric | 70.4905 | 3.7858 | | | | 99.0000 |
| S11 | Aspheric | −20.2516 | 3.0000 | 1.66 | 21.5 | 18.28 | −5.9739 |
| S12 | Aspheric | −7.9899 | 0.4853 | | | | −16.9970 |
| S13 | Aspheric | −9.9152 | 0.6285 | 1.55 | 56.1 | −12.95 | −99.0000 |
| S14 | Aspheric | 25.2960 | 7.2182 | | | | −98.4658 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −1.2631E−04 | −1.5704E−05 | −1.6258E−07 | 1.0145E−08 | 2.9317E−09 | 0.0000E+00 | 0.0000E+00 | 0.0000E+00 | 0.0000E+00 |
| S2 | −2.4085E−04 | −6.5513E−05 | −3.0437E−06 | 1.8407E−07 | 4.4662E−09 | 0.0000E+00 | 0.0000E+00 | 0.0000E+00 | 0.0000E+00 |
| S3 | −7.8064E−04 | −3.5066E−05 | 1.6402E−06 | 2.0870E−07 | −1.0207E−08 | 0.0000E+00 | 0.0000E+00 | 0.0000E+00 | 0.0000E+00 |
| S4 | −9.9492E−04 | −9.7713E−06 | 2.9504E−06 | 4.6704E−07 | −3.0404E−08 | 8.0383E−10 | 0.0000E+00 | 0.0000E+00 | 0.0000E+00 |
| S5 | −1.2362E−03 | −4.2182E−05 | −5.1624E−06 | −1.5680E−07 | −2.3701E−08 | 0.0000E+00 | 0.0000E+00 | 0.0000E+00 | 0.0000E+00 |
| S6 | −7.1418E−04 | 1.4537E−05 | −3.7218E−07 | −3.5990E−07 | −5.3310E−09 | 0.0000E+00 | 0.0000E+00 | 0.0000E+00 | 0.0000E+00 |
| S7 | −3.4551E−04 | −5.1422E−05 | 6.1184E−06 | 2.3398E−06 | −1.6582E−07 | 0.0000E+00 | 0.0000E+00 | 0.0000E+00 | 0.0000E+00 |
| S8 | −7.2973E−04 | −1.3533E−04 | −2.0117E−06 | 2.2360E−06 | −1.7163E−07 | 0.0000E+00 | 0.0000E+00 | 0.0000E+00 | 0.0000E+00 |
| S9 | 1.1460E−03 | −5.6433E−05 | −1.3608E−05 | −1.4398E−06 | 1.2306E−07 | 0.0000E+00 | 0.0000E+00 | 0.0000E+00 | 0.0000E+00 |
| S10 | 2.6731E−04 | 8.7358E−06 | −5.0910E−06 | −5.9827E−06 | 8.8949E−07 | −2.6629E−08 | 0.0000E+00 | 0.0000E+00 | 0.0000E+00 |
| S11 | −2.1698E−03 | 5.7645E−04 | −1.0150E−03 | 9.1043E−04 | −5.0930E−04 | 1.7730E−04 | −3.7281E−05 | 4.3392E−06 | −2.1407E−07 |
| S12 | −4.3431E−03 | 3.8070E−03 | −4.8878E−03 | 3.8380E−03 | −1.8526E−03 | 5.5076E−04 | −9.8609E−05 | 9.7378E−06 | −4.0596E−07 |
| S13 | −2.6932E−02 | 1.5275E−02 | −1.4395E−02 | 1.0387E−02 | −4.9206E−03 | 1.4719E−03 | −2.6838E−04 | 2.7122E−05 | −1.1572E−06 |
| S14 | −1.3882E−02 | 4.5401E−03 | −3.6960E−03 | 2.4449E−03 | −1.0318E−03 | 2.6897E−04 | −4.2218E−05 | 3.6474E−06 | −1.3218E−07 |

FIG. 10A illustrates the longitudinal aberration curve of the optical imaging system according to Example 5, representing deviations of focal points converged by light of different wavelengths after passing through the lens assembly. FIG. 10B illustrates the astigmatic curve of the optical imaging system according to Example 5, representing a curvature of a tangential plane and a curvature of a sagittal plane. FIG. 10C illustrates the distortion curve of the optical imaging system according to Example 5, representing the amounts of distortion corresponding to different image heights. FIG. 10D illustrates the lateral color curve of the optical imaging system according to Example 5, representing deviations of different heights of images on an imaging plane formed by light passing through the lens assembly. It can be seen from FIG. 10A to FIG. 10D that the optical imaging system provided in Example 5 can achieve good imaging quality.

Example 6

Figure 11:
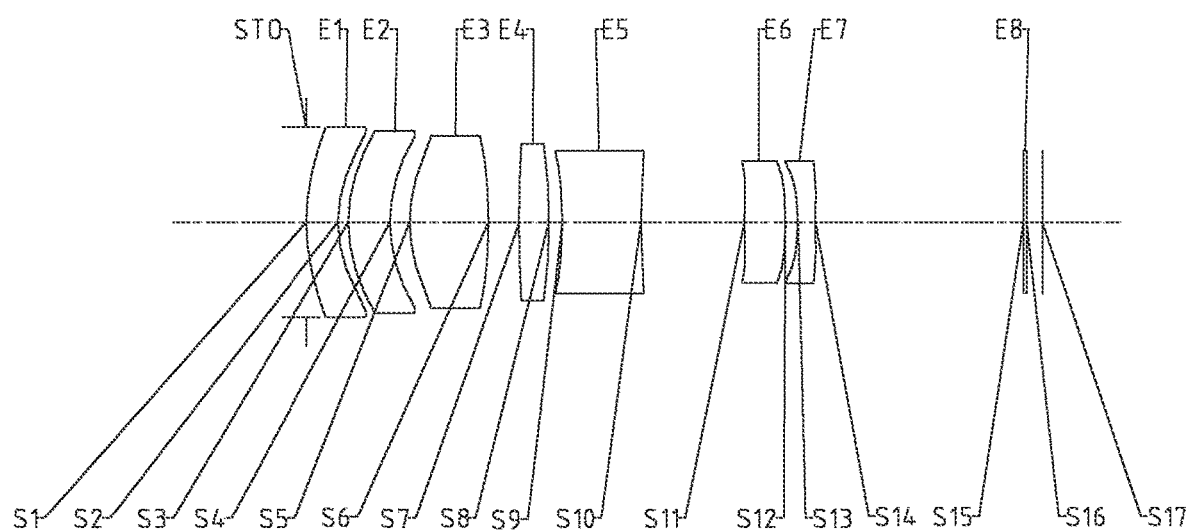
FIG. 11 is a schematic structural diagram illustrating an optical imaging system according to Example 6 of the present disclosure.

An optical imaging system according to Example 6 of the present disclosure is described below with reference to FIG. 11 to FIG. 12D. FIG. 11 illustrates a schematic structural diagram of the optical imaging system according to Example 6 of the present disclosure.

As shown in FIG. 11, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a convex surface, and an image-side surface S12 of the sixth lens is a convex surface. The seventh lens E7 has a negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 27.00 mm, a total track length TTL of the optical imaging system is 28.00 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.73.

Table 11 is a table illustrating basic parameters of the optical imaging system of Example 6, where the units for the radius of curvature, the thickness/distance and the focal length are millimeter (mm). Table 12 shows high-order coefficients applicable to each aspheric surface in Example 6, where the surface shape of each aspheric surface may be defined by the formula (1) given in the above Example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 8.5771 | 1.2020 | 1.55 | 56.1 | −26.16 | 0.0000 |
| S2 | Aspheric | 5.0951 | 0.3960 | | | | −1.0033 |
| S3 | Aspheric | 6.1076 | 1.5817 | 1.66 | 21.5 | 117.96 | 0.1727 |
| S4 | Aspheric | 5.9479 | 0.7500 | | | | 0.2953 |
| S5 | Aspheric | 5.9079 | 3.0000 | 1.50 | 81.6 | 9.41 | −0.1905 |
| S6 | Aspheric | −18.9815 | 1.1523 | | | | −39.3603 |
| S7 | Aspheric | 50.1354 | 1.1303 | 1.55 | 56.1 | 36.58 | −94.1447 |
| S8 | Aspheric | −32.9765 | 0.5184 | | | | 50.6476 |
| S9 | Aspheric | −14.4588 | 3.0000 | 1.64 | 23.9 | −12.56 | −4.3770 |
| S10 | Aspheric | 19.7034 | 3.9339 | | | | −92.4312 |
| S11 | Aspheric | 30.0415 | 1.5597 | 1.66 | 21.5 | 15.47 | −99.0000 |
| S12 | Aspheric | −15.0822 | 0.4790 | | | | −26.2451 |
| S13 | Aspheric | −9.8952 | 0.6552 | 1.55 | 56.1 | −12.27 | −97.7999 |
| S14 | Aspheric | 21.3092 | 7.9308 | | | | −4.0837 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −2.3023E−04 | −2.2891E−05 | −3.6288E−07 | −7.5537E−09 | 2.9918E−09 | 0.0000E+00 | 0.0000E+00 | 0.0000E+00 | 0.0000E+00 |
| S2 | −3.1859E−05 | −5.9530E−05 | −3.2488E−06 | 1.7863E−07 | 2.9454E−09 | 0.0000E+00 | 0.0000E+00 | 0.0000E+00 | 0.0000E+00 |

TABLE 12-continued

| Surface number | A4 | A6 | A8 | A10 | A12 | A14 | A16 | A18 | A20 |
|---|---|---|---|---|---|---|---|---|---|
| S3 | −6.7864E−04 | −3.5710E−05 | 1.7504E−06 | 1.7851E−07 | −1.2617E−08 | 0.0000E+00 | 0.0000E+00 | 0.0000E+00 | 0.0000E+00 |
| S4 | −1.0033E−03 | −9.2012E−06 | 2.1997E−06 | 4.9391E−07 | −2.9798E−08 | −5.9974E−10 | 0.0000E+00 | 0.0000E+00 | 0.0000E+00 |
| S5 | −8.2758E−04 | −2.2687E−05 | −2.5353E−06 | −3.9348E−09 | −1.0172E−08 | 0.0000E+00 | 0.0000E+00 | 0.0000E+00 | 0.0000E+00 |
| S6 | −6.3108E−04 | 1.5357E−05 | −3.5870E−07 | −3.0339E−07 | 3.8058E−09 | 0.0000E+00 | 0.0000E+00 | 0.0000E+00 | 0.0000E+00 |
| S7 | −5.8047E−04 | −5.3271E−05 | 5.9679E−06 | 2.2957E−06 | −1.6403E−07 | 0.0000E+00 | 0.0000E+00 | 0.0000E+00 | 0.0000E+00 |
| S8 | −1.5197E−04 | −1.1114E−04 | −4.8209E−07 | 2.3580E−06 | −1.7110E−07 | 0.0000E+00 | 0.0000E+00 | 0.0000E+00 | 0.0000E+00 |
| S9 | 1.0070E−03 | −4.2757E−05 | −1.2544E−05 | −1.4539E−06 | 1.1024E−07 | 0.0000E+00 | 0.0000E+00 | 0.0000E+00 | 0.0000E+00 |
| S10 | 4.2286E−04 | −8.1691E−05 | −7.0251E−06 | −5.7249E−06 | 8.9798E−07 | −3.6222E−08 | 0.0000E+00 | 0.0000E+00 | 0.0000E+00 |
| S11 | −3.8537E−03 | 5.8572E−04 | −1.0628E−03 | 9.0612E−04 | −5.0926E−04 | 1.7737E−04 | −3.7268E−05 | 4.3398E−06 | −2.1463E−07 |
| S12 | −5.8654E−03 | 3.6795E−03 | −4.9016E−03 | 3.8386E−03 | −1.8519E−03 | 5.5086E−04 | −9.8605E−05 | 9.7362E−06 | −4.0647E−07 |
| S13 | −2.7415E−02 | 1.5579E−02 | −1.4358E−02 | 1.0389E−02 | −4.9206E−03 | 1.4719E−03 | −2.6838E−04 | 2.7123E−05 | −1.1576E−06 |
| S14 | −1.2380E−02 | 4.6178E−03 | −3.6858E−03 | 2.4446E−03 | −1.0321E−03 | 2.6889E−04 | −4.2226E−05 | 3.6482E−06 | −1.3147E−07 |

Figure 12A:
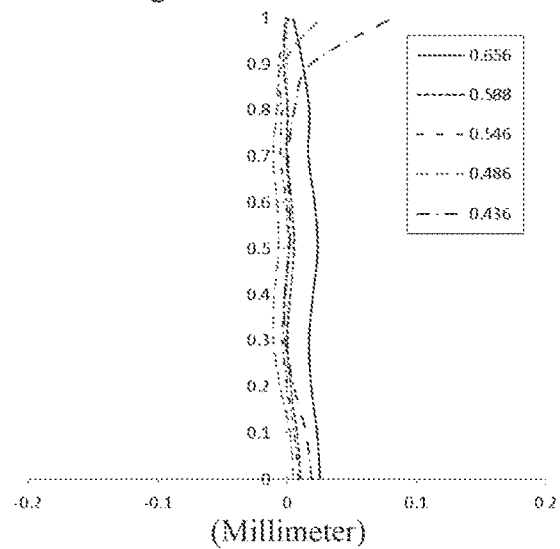
FIGS. 12A-12D respectively illustrate a longitudinal aberration curve, an astigmatic curve, a distortion curve and a lateral color curve of the optical imaging system according to Example 6.
Figure 12B:
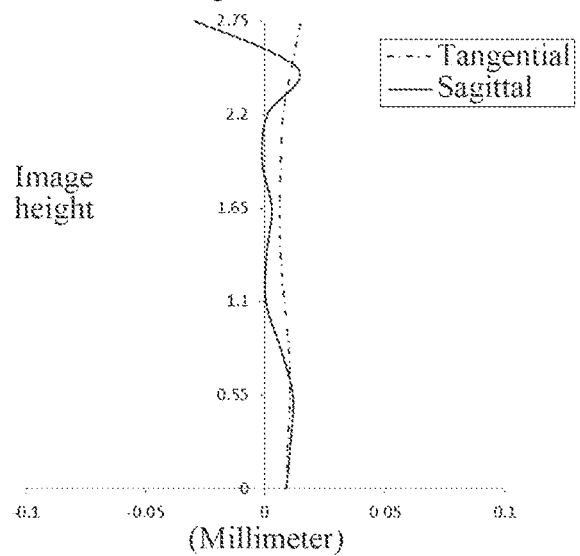
Figure 12C:
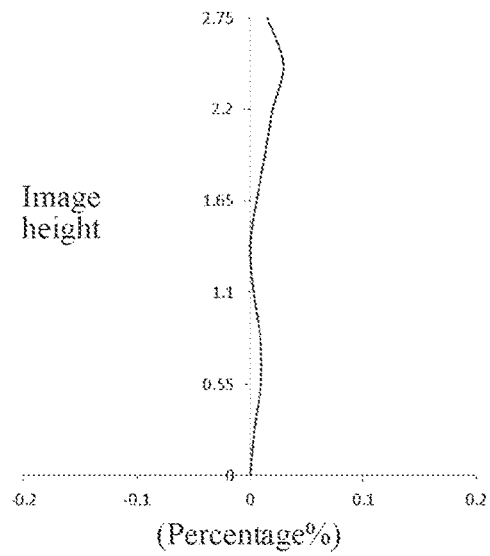
Figure 12D:
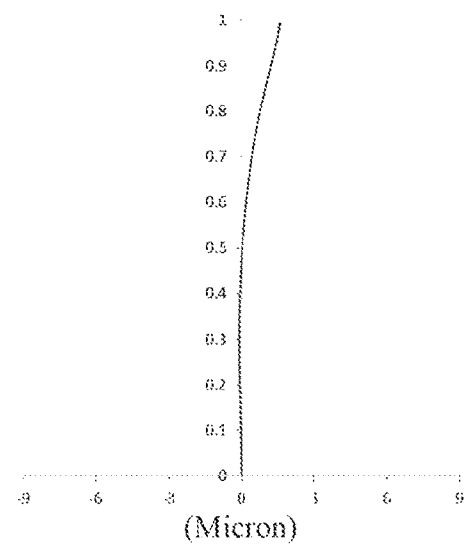

FIG. 12A illustrates the longitudinal aberration curve of the optical imaging system according to Example 6, representing deviations of focal points converged by light of different wavelengths after passing through the lens assembly. FIG. 12B illustrates the astigmatic curve of the optical imaging system according to Example 6, representing a curvature of a tangential plane and a curvature of a sagittal plane. FIG. 12C illustrates the distortion curve of the optical imaging system according to Example 6, representing the amounts of distortion corresponding to different image heights. FIG. 12D illustrates the lateral color curve of the optical imaging system according to Example 6, representing deviations of different heights of images on an imaging plane formed by light passing through the lens assembly. It can be seen from FIG. 12A to FIG. 12D that the optical imaging system provided in Example 6 can achieve good imaging quality.

Example 7

An optical imaging system according to Example 7 of the present disclosure is described below with reference to FIG. 13 to FIG. 14D. FIG. 13 illustrates a schematic structural diagram of the optical imaging system according to Example 7 of the present disclosure.

As shown in FIG. 13, the optical imaging system from an object side to an image side sequentially includes: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 of the first lens is a convex surface, and an image-side surface S2 of the first lens is a concave surface. The second lens E2 has a positive refractive power, an object-side surface S3 of the second lens is a convex surface, and an image-side surface S4 of the second lens is a concave surface. The third lens E3 has a positive refractive power, an object-side surface S5 of the third lens is a convex surface, and an image-side surface S6 of the third lens is a convex surface. The fourth lens E4 has a positive refractive power, an object-side surface S7 of the fourth lens is a convex surface, and an image-side surface S8 of the fourth lens is a convex surface. The fifth lens E5 has a negative refractive power, an object-side surface S9 of the fifth lens is a concave surface, and an image-side surface S10 of the fifth lens is a concave surface. The sixth lens E6 has a positive refractive power, an object-side surface S11 of the sixth lens is a concave surface, and an image-side surface S12 of the sixth lens is a convex surface. The seventh lens E7 has a negative refractive power, an object-side surface S13 of the seventh lens is a concave surface, and an image-side surface S14 of the seventh lens is a convex surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging system is 27.02 mm, a total track length TTL of the optical imaging system is 27.88 mm, a half of a diagonal length ImgH of an effective pixel area on the imaging plane S17 of the optical imaging system is 2.75 mm, a half of a maximum field-of-view Semi-FOV of the optical imaging system is 5.8°, and an F number Fno of the optical imaging system is 3.73.

Table 13 is a table illustrating basic parameters of the optical imaging system of Example 7, where the units for the radius of curvature, the thickness/distance and the focal length are millimeter (mm). Table 14 shows high-order coefficients applicable to each aspheric surface in Example 7, where the surface shape of each aspheric surface may be defined by the formula (1) given in the above Example 1.

TABLE 13

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | 0.0000 | | | | |
| S1 | Aspheric | 9.0618 | 2.4297 | 1.55 | 56.1 | −23.46 | 0.0000 |
| S2 | Aspheric | 4.8064 | 0.2996 | | | | −0.8705 |
| S3 | Aspheric | 5.5868 | 0.8754 | 1.66 | 21.5 | 187.39 | 0.2086 |
| S4 | Aspheric | 5.4881 | 0.7500 | | | | 0.2825 |
| S5 | Aspheric | 5.1067 | 3.0000 | 1.50 | 81.6 | 8.70 | −0.1000 |
| S6 | Aspheric | −23.1731 | 1.0180 | | | | −27.6695 |
| S7 | Aspheric | 66.0471 | 0.8629 | 1.55 | 56.1 | 53.93 | −91.0114 |

TABLE 13-continued

| Surface number | Surface type | Radius of curvature | Thickness/ Distance | Material Refractive index | Abbe number | Focal length | Conic coefficient |
|---|---|---|---|---|---|---|---|
| S8 | Aspheric | −52.9751 | 0.4652 | | | | −51.4702 |
| S9 | Aspheric | −19.2308 | 3.0000 | 1.64 | 23.9 | −17.09 | 2.0476 |
| S10 | Aspheric | 27.0586 | 3.7891 | | | | −86.5745 |
| S11 | Aspheric | −8.7741 | 0.6616 | 1.66 | 21.5 | 19.72 | 7.0362 |
| S12 | Aspheric | −5.3914 | 0.4840 | | | | −4.7537 |
| S13 | Aspheric | −6.1187 | 0.4951 | 1.55 | 56.1 | −14.71 | −29.0625 |
| S14 | Aspheric | −26.3364 | 9.0349 | | | | −89.8372 |
| S15 | Spherical | Infinite | 0.1100 | 1.62 | 64.2 | | |
| S16 | Spherical | Infinite | 0.6001 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | −2.8893E−04 | −1.9240E−05 | −5.0063E−08 | −4.3281E−09 | 8.5571E−10 | 0.0000E+00 | 0.0000E+00 | 0.0000E+00 | 0.0000E+00 |
| S2 | 1.1849E−04 | −6.0968E−05 | −3.5973E−06 | 1.6135E−07 | 4.5441E−09 | 0.0000E+00 | 0.0000E+00 | 0.0000E+00 | 0.0000E+00 |
| S3 | −6.4652E−04 | −3.1535E−05 | 2.0360E−06 | 1.9021E−07 | −1.3546E−08 | 0.0000E+00 | 0.0000E+00 | 0.0000E+00 | 0.0000E+00 |
| S4 | −1.0170E−03 | −9.4669E−06 | 2.1508E−06 | 4.8405E−07 | −2.9846E−08 | −3.8241E−10 | 0.0000E+00 | 0.0000E+00 | 0.0000E+00 |
| S5 | −6.8973E−04 | −1.9229E−05 | −2.4249E−06 | 1.5578E−08 | −7.5191E−09 | 0.0000E+00 | 0.0000E+00 | 0.0000E+00 | 0.0000E+00 |
| S6 | −6.5177E−04 | 1.7063E−05 | −1.3875E−07 | −2.8586E−07 | 5.2014E−09 | 0.0000E+00 | 0.0000E+00 | 0.0000E+00 | 0.0000E+00 |
| S7 | −6.6873E−04 | −5.8610E−05 | 5.7835E−06 | 2.2868E−06 | −1.6185E−07 | 0.0000E+00 | 0.0000E+00 | 0.0000E+00 | 0.0000E+00 |
| S8 | −2.2893E−05 | −1.0936E−04 | −8.3541E−07 | 2.3313E−06 | −1.7516E−07 | 0.0000E+00 | 0.0000E+00 | 0.0000E+00 | 0.0000E+00 |
| S9 | 7.5251E−04 | −5.2473E−05 | −1.2208E−05 | −1.4205E−06 | 1.1368E−07 | 0.0000E+00 | 0.0000E+00 | 0.0000E+00 | 0.0000E+00 |
| S10 | 6.9946E−04 | −6.8630E−05 | −8.9160E−06 | −5.6318E−06 | 9.3976E−07 | −4.3396E−08 | 0.0000E+00 | 0.0000E+00 | 0.0000E+00 |
| S11 | −2.0411E−03 | 7.0726E−04 | −1.0600E−03 | 9.0629E−04 | −5.0909E−04 | 1.7742E−04 | −3.7262E−05 | 4.3385E−06 | −2.1567E−07 |
| S12 | −6.4485E−03 | 3.7396E−03 | −4.8905E−03 | 3.8389E−03 | −1.8521E−03 | 5.5081E−04 | −9.8612E−05 | 9.7354E−06 | −4.0654E−07 |
| S13 | −2.8706E−02 | 1.5529E−02 | −1.4374E−02 | 1.0387E−02 | −4.9208E−03 | 1.4719E−03 | −2.6838E−04 | 2.7123E−05 | −1.1572E−06 |
| S14 | −1.1952E−02 | 4.3243E−03 | −3.7033E−03 | 2.4451E−03 | −1.0317E−03 | 2.6897E−04 | −4.2218E−05 | 3.6475E−06 | −1.3203E−07 |

Figure 14C:
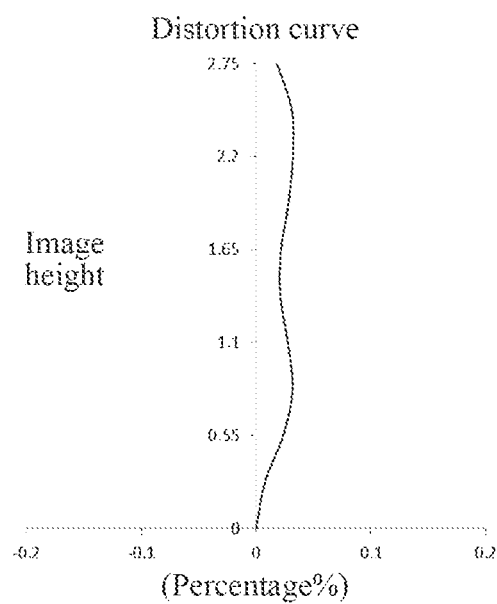
Figure 14D:
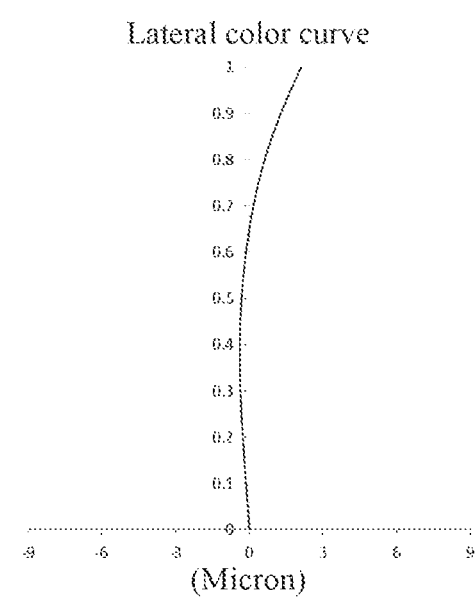

FIG. 14A illustrates the longitudinal aberration curve of the optical imaging system according to Example 7, representing deviations of focal points converged by light of different wavelengths after passing through the lens assembly. FIG. 14B illustrates the astigmatic curve of the optical imaging system according to Example 7, representing a curvature of a tangential plane and a curvature of a sagittal plane. FIG. 14C illustrates the distortion curve of the optical imaging system according to Example 7, representing the amounts of distortion corresponding to different image heights. FIG. 14D illustrates the lateral color curve of the optical imaging system according to Example 7, representing deviations of different heights of images on an imaging plane formed by light passing through the lens assembly. It can be seen from FIG. 14A to FIG. 14D that the optical imaging system provided in Example 7 can achieve good imaging quality.

In view of the above, examples 1 to 7 respectively satisfy the relationship shown in Table 15.

TABLE 15

| Conditional/Example | 1 | 2 | 3 | 4 | 5 | 6 | 7 |
|---|---|---|---|---|---|---|---|
| |f2/f4| | 4.05 | 5.63 | 4.44 | 6.88 | 1.21 | 3.23 | 3.47 |
| |f7/f6| | 0.64 | 0.99 | 0.63 | 1.66 | 0.71 | 0.79 | 0.75 |
| |f1/f3| | 2.98 | 5.81 | 3.54 | 2.60 | 3.66 | 2.78 | 2.70 |
| |R10/R9| | 4.81 | 3.78 | 3.74 | 2.99 | 5.76 | 1.36 | 1.41 |
| |R14/R13| | 2.92 | 2.48 | 2.51 | 1.35 | 2.55 | 2.15 | 4.30 |
| |R3/R2| | 1.18 | 1.80 | 1.22 | 1.04 | 1.20 | 1.20 | 1.16 |
| V6/R6 (mm−1) | −1.24 | −2.99 | −2.48 | −2.12 | −2.24 | −1.13 | −0.93 |
| f/R5 | 5.35 | 2.78 | 5.34 | 4.66 | 4.83 | 4.57 | 5.29 |
| T56/CT6 | 2.93 | 1.42 | 3.24 | 1.22 | 1.26 | 2.52 | 5.73 |
| CT2/CT7 | 3.73 | 3.57 | 4.08 | 1.34 | 1.92 | 2.41 | 1.77 |
| CT3/CT1 | 1.00 | 0.99 | 1.00 | 1.20 | 2.56 | 2.50 | 1.23 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, along an optical axis from an object side to an image side, sequentially comprising:
   a stop;
   a first lens having a refractive power;
   a second lens having a positive refractive power;
   a third lens having a positive refractive power, an object-side surface of the third lens being a convex surface, and an image-side surface of the third lens being a convex surface;
   a fourth lens having a refractive power, and an image-side surface of the fourth lens being a convex surface;
   a fifth lens having a refractive power, and an image-side surface of the fifth lens being a concave surface;
   a sixth lens having a refractive power; and
   a seventh lens having a refractive power,
   a half of a maximum field-of-view Semi-FOV of the optical imaging system satisfying: Semi-FOV≤6°; and
   a total effective focal length f of the optical imaging system satisfying: f≥25 mm.

2. The optical imaging system according to claim 1, wherein an effective focal length f2 of the second lens and an effective focal length f4 of the fourth lens satisfy: 1.0<|f2/f4|<7.0.

3. The optical imaging system according to claim 1, wherein an effective focal length f6 of the sixth lens and an effective focal length f7 of the seventh lens satisfy: 0.5<|f7/f6|<2.0.

4. The optical imaging system according to claim 1, wherein an effective focal length f1 of the first lens and an effective focal length f3 of the third lens satisfy: 2.5<|f1/f3|<6.0.

5. The optical imaging system according to claim 1, wherein a radius of curvature R9 of an object-side surface of the fifth lens and a radius of curvature R10 of the image-side surface of the fifth lens satisfy: 1.3<|R10/R9|<5.8.

6. The optical imaging system according to claim 1, wherein a radius of curvature R13 of an object-side surface of the seventh lens and a radius of curvature R14 of an image-side surface of the seventh lens satisfy: 1.0<|R14/R13|<4.5.

7. The optical imaging system according to claim 1, wherein a radius of curvature R2 of an image-side surface of the first lens and a radius of curvature R3 of an object-side surface of the second lens satisfy: 1.0<|R3/R2|<2.0.

8. The optical imaging system according to claim 1, wherein a radius of curvature R6 of the image-side surface of the third lens and an abbe number V6 of the sixth lens satisfy: $-3.0$ mm$^{-1}$<V6/R6<$-0.5$ mm$^{-1}$.

9. The optical imaging system according to claim 1, wherein the total effective focal length f of the optical imaging system and a radius of curvature R5 of the object-side surface of the third lens satisfy: 2.5<f/R5<5.5.

10. The optical imaging system according to claim 1, wherein a spaced interval T56 between the image-side surface of the fifth lens and an object-side surface of the sixth lens on the optical axis and a center thickness CT6 of the sixth lens on the optical axis satisfy: 1.0<T56/CT6<6.0.

11. The optical imaging system according to claim 1, wherein a center thickness CT2 of the second lens on the optical axis and a center thickness CT7 of the seventh lens on the optical axis satisfy: 1.0<CT2/CT7<4.1.

12. The optical imaging system according to claim 1, wherein a center thickness CT1 of the first lens on the optical axis and a center thickness CT3 of the third lens on the optical axis satisfy: 0.9<CT3/CT1<2.6.

13. The optical imaging system according to claim 1, wherein the optical imaging system further comprises a reflective component arranged on the optical axis to change a propagation path of light.

14. An optical imaging system, along an optical axis from an object side to an image side, sequentially comprising:
   a stop;
   a first lens having a refractive power;
   a second lens having a positive refractive power;
   a third lens having a positive refractive power, an object-side surface of the third lens being a convex surface, and an image-side surface of the third lens being a convex surface;
   a fourth lens having a refractive power, and an image-side surface of the fourth lens being a convex surface;
   a fifth lens having a refractive power, and an image-side surface of the fifth lens being a concave surface;
   a sixth lens having a refractive power; and
   a seventh lens having a refractive power,
   a half of a maximum field-of-view Semi-FOV of the optical imaging system satisfying: Semi-FOV≤6°; and
   a total effective focal length f of the optical imaging system and a radius of curvature R5 of the object-side surface of the third lens satisfying: 2.5<f/R5<5.5.

15. The optical imaging system according to claim 14, wherein an effective focal length f2 of the second lens and an effective focal length f4 of the fourth lens satisfy: 1.0<|f2/f4|<7.0.

16. The optical imaging system according to claim 14, wherein an effective focal length f6 of the sixth lens and an effective focal length f7 of the seventh lens satisfy: 0.5<|f7/f6|<2.0.

17. The optical imaging system according to claim 14, wherein an effective focal length f1 of the first lens and an effective focal length f3 of the third lens satisfy: 2.5<|f1/f3|<6.0.

18. The optical imaging system according to claim 14, wherein a radius of curvature R9 of an object-side surface of the fifth lens and a radius of curvature R10 of the image-side surface of the fifth lens satisfy: 1.3<|R10/R9|<5.8.

19. The optical imaging system according to claim 14, wherein a radius of curvature R13 of an object-side surface of the seventh lens and a radius of curvature R14 of an image-side surface of the seventh lens satisfy: 1.0<|R14/R13|<4.5.

20. The optical imaging system according to claim 14, wherein a radius of curvature R2 of an image-side surface of the first lens and a radius of curvature R3 of an object-side surface of the second lens satisfy: $1.0<|R3/R2|<2.0$.

* * * * *